(12) United States Patent
Liu

(10) Patent No.: US 11,592,306 B2
(45) Date of Patent: Feb. 28, 2023

(54) METHOD AND DEVICE FOR ELECTRIC VEHICLE NAVIGATION BASED ON BATTERY PROFILE AND ROUTE CHARACTERISTICS

(71) Applicant: TWS Technology(Guangzhou) Limited, Gangzhou (CN)

(72) Inventor: Charles Liu, Belmont, CA (US)

(73) Assignee: TWS Technology(Guangzhou) Limited, Guangzhou (CN)

( * ) Notice: Subject to any disclaimer, the term of this patent is extended or adjusted under 35 U.S.C. 154(b) by 292 days.

(21) Appl. No.: 17/098,873

(22) Filed: Nov. 16, 2020

(65) Prior Publication Data

US 2021/0389145 A1 Dec. 16, 2021

Related U.S. Application Data

(60) Provisional application No. 63/037,742, filed on Jun. 11, 2020.

(51) Int. Cl.
*G01C 21/34* (2006.01)
(52) U.S. Cl.
CPC ..... *G01C 21/3469* (2013.01); *G01C 21/3446* (2013.01); *G01C 21/3476* (2013.01)
(58) Field of Classification Search
CPC ............ G01C 21/3469; G01C 21/3446; G01C 21/3476
See application file for complete search history.

(56) References Cited

U.S. PATENT DOCUMENTS

| | | | | |
|---|---|---|---|---|
| 2008/0249667 A1* | 10/2008 | Horvitz | ............... | B60W 40/072 701/1 |
| 2010/0094496 A1* | 4/2010 | Hershkovitz | ........... | B60L 53/14 701/22 |
| 2011/0246004 A1* | 10/2011 | Mineta | .................. | B60W 20/11 903/903 |
| 2013/0179057 A1* | 7/2013 | Fisher | .................... | B60L 53/66 701/1 |
| 2013/0261914 A1* | 10/2013 | Ingram | ................. | B64C 39/024 701/423 |
| 2015/0298680 A1* | 10/2015 | Matthews | ............ | B60W 10/08 180/65.265 |
| 2017/0307391 A1* | 10/2017 | Mason | ................... | G08G 1/202 |

(Continued)

*Primary Examiner* — Ryan Rink
(74) *Attorney, Agent, or Firm* — Murphy, Bilak & Homiller, PLLC

(57) ABSTRACT

Embodiments include methods, for a wireless device, to determine one or more preferred routes for an electric vehicle powered by a battery. Such methods include determining multiple candidate routes from a starting point to a destination. Each candidate route includes one or more segments, each segment associated with a slope and a distance. Such methods include, for each candidate route, estimating a route battery discharge amount and a route duration of travel based on a discharge profile for the battery and the slopes and distances associated with the segments of the candidate route. Such methods include selecting one or more preferred routes, from the candidate routes, based on a current state of charge for the battery, the route battery discharge amounts, and the route durations of travel. Other embodiments include wireless devices configured to perform such methods, and electric vehicles operably coupled to such wireless devices.

22 Claims, 8 Drawing Sheets

(56) References Cited

U.S. PATENT DOCUMENTS

| | | | |
|---|---|---|---|
| 2018/0143029 A1* | 5/2018 | Nikulin | G01C 21/3415 |
| 2018/0143639 A1* | 5/2018 | Singhal | G06Q 30/0269 |
| 2019/0178678 A1* | 6/2019 | Rahbari Asr | B60L 53/66 |
| 2019/0383637 A1* | 12/2019 | Teske | B60L 53/65 |
| 2020/0070679 A1* | 3/2020 | Wang | B60W 10/26 |
| 2020/0117204 A1* | 4/2020 | Lindemann | B60W 60/0023 |
| 2020/0191589 A1* | 6/2020 | Tamai | G01C 21/3697 |
| 2020/0391612 A1* | 12/2020 | Lee | G01C 21/3469 |
| 2021/0061278 A1* | 3/2021 | Zhao | B60W 40/06 |
| 2021/0065073 A1* | 3/2021 | Maeda | H04L 67/52 |
| 2022/0228877 A1* | 7/2022 | Feldman | B60L 53/305 |

* cited by examiner

METHOD AND DEVICE FOR ELECTRIC VEHICLE NAVIGATION BASED ON BATTERY PROFILE AND ROUTE CHARACTERISTICS

TECHNICAL FIELD

The present invention generally relates to electric vehicles (EVs), and more specifically relates to navigation and/or route-finding techniques for EVs that consider capabilities and/or conditions of each EV's battery and physical characteristics of various candidate routes.

BACKGROUND

An electric vehicle (EV) uses one or more electric motors to drive the EV's wheels for propulsion. In most cases, EVs are powered by battery packs carried on the EV, with the size of the battery pack being related to the size, weight, and performance requirements of the EV itself. In some instances, the EV may also include an internal combustion engine that runs on fossil fuel(s); these are often referred to as hybrid EVs. Many different types of EVs are currently being produced or planned for production, including cars, trucks, buses, motorcycles, scooters, and trains. In addition to these EVs that operate on hard surfaces (e.g., roads), other current or planned EVs include aircraft, surface ships, underwater vessels, and spacecraft.

The battery packs used in most EVs contain a large collection of rechargeable cells and are controlled by battery management systems (BMS). A battery pack with built-in BMS may also be referred to as a "smart battery pack" or "intelligent battery pack." Among other tasks, a BMS protects the battery pack from operating outside its safe operating area, monitors its state, calculates and reports battery status information, and receives control information from a host platform (e.g., EV). Communications with a host platform can be facilitated by an external communication interface, which can also be used to communicate with other host platforms such as battery chargers and diagnostic stations. The communication interface may be included in the same or a different wiring harness or connector as the wires that carry energy between the battery and the host platform.

Recently, shared transportation has grown rapidly due to a renewed interest in urbanism and growing environmental, energy, and economic concerns have intensified the need for sustainable alternatives. This has been facilitated by advances in electronic and wireless technologies, which have made sharing vehicles easier and more efficient. These services can be divided into two main types: ride sharing (or shared ride), where users are matched to empty seats in a vehicle; and vehicle sharing (or shared vehicle), where a single vehicle is available for use by any subscriber to the service. EVs are increasingly being used in shared-vehicle services, including scooter-sharing services such as such as Lyme, Bird, etc.

Another current trend is the increasing use of navigation services for identifying potential routes from a starting point to a destination. This trend has been facilitated by wide availability of handheld wireless devices (e.g., smartphones) and mapping and/or navigation applications (e.g., Google Maps) that are built in or downloadable to such devices via communication with a wide-area wireless network (e.g., cellular network). This trend has also been facilitated by increased data speeds and capacities of such networks, including the current 4G/LTE networks and the soon-to-be deployed 5G networks.

Given a starting point and a destination, some of these applications can provide multiple route options, each associated with an estimated transit time. Some of these applications can also provide estimated transit times associated with different transit modes (e.g., car, bike, walk, public transport, etc.) for each route option. For vehicle-based transit modes, however, the estimated transit times do not consider vehicle limitations, such as conditions and/or capabilities of an EV's battery.

SUMMARY

Embodiments of the present disclosure provide specific improvements to navigation services used with EVs, such as by facilitating solutions to overcome the exemplary problems summarized above and described in more detail below.

Some embodiments of the present disclosure include methods (e.g., procedures) for determining a preferred route for an electric vehicle (EV) powered by a battery. These exemplary methods can be implemented in a wireless device (e.g., user equipment, modem, etc.) configured for communication with the battery and/or the vehicle.

These exemplary methods can include determining a plurality of candidate routes from the starting point to the destination. Each candidate route can include a plurality of segments, with each segment being associated with a slope and a distance. These exemplary methods can also include estimating, for each candidate route, a route battery discharge amount and a route duration of travel based on a discharge profile for the battery and the slopes and distances associated with the segments included in the candidate route. These exemplary methods can also include selecting one or more preferred routes, from the candidate routes, based on a current state of charge (SOC) for the battery, the route battery discharge amounts, and the route durations of travel.

In some embodiments, the discharge profile can include a plurality of discharge current levels. In such embodiments, the estimating operations can include, for each segment, determining a plurality of candidate tuples corresponding to the respective plurality of discharge current levels. Each candidate tuple can include:

a segment duration of travel at a speed associated with the corresponding discharge current level and with the segment slope, and a segment battery discharge amount.

In some of these embodiments, the estimating operations can include selecting one of the candidate tuples for each segment based on one of the following criteria: minimum segment battery discharge amount; minimum segment duration of travel; minimum segment battery discharge amount subject to a segment duration of travel less than a first threshold; or minimum segment duration of travel subject to a segment battery discharge amount less than a second threshold.

In some embodiments, the estimating operations can also include, for each candidate route, determining the route battery discharge amount based on a sum of segment battery discharge amounts for the respective segments of the candidate route and determining the route duration of travel based on a sum of segment durations of travel for the respective segments of the candidate route.

In some embodiments, the one or more preferred routes can be candidate routes having minimum route durations of travel and at least one of the following:

route battery discharge amounts less than the current SOC, charging stations for recharging the battery, and exchange stations for exchanging the vehicle or the battery.

In some embodiments, the one or more preferred routes can include a plurality of preferred routes. In such embodiments, these exemplary methods can also include displaying information about the plurality of preferred routes to a user. The displayed information for each preferred route can includes a route duration of travel and an indication of whether the route can be completed with the current SOC. In such embodiments, these exemplary methods can also include receiving, from the user, a selection of one of the preferred routes. In some embodiments, the displayed information for each preferred route can also include one or more of the following:

- locations for one or more charging stations in relation to the preferred route;
- occupancy or availability of the charging stations;
- charging capability of the charging stations; and
- any user incentives associated with the preferred route.

In some embodiments, the displayed information for each preferred route can also include one or more of the following:

- locations for one or more exchange stations in relation to the preferred route;
- inventory of vehicles or batteries available for exchange at the exchange stations;
- SOC of the vehicles or batteries available for exchange at the exchange stations;
- one or more recommended vehicles or batteries available for exchange at the exchange stations; and
- any user incentives associated with the preferred route.

In some embodiments, these exemplary methods can also include retrieving map information from a remote database via a connection with a wide-area wireless network. The plurality of routes can be determined based on the retrieved map information. This can be done based on various known techniques. In some embodiments, the retrieved map information can include the slope and the distance associated with the respective segments. In other embodiments, the map information can include elevation information from which the wireless device can determine the respective slopes.

In some embodiments, these exemplary methods can also include retrieving the SOC and the discharge profile from the vehicle or the battery via a connection with a wide-area wireless network, a short-range wireless connection to the vehicle or the battery, or a wired connection to the vehicle or the battery. Wireless connections can be facilitated by compatible wireless transceivers in the wireless device, battery, vehicle, and/or wireless network, or a wired connection can be facilitated by a data communications bus connected to both communicating entities.

In some embodiments, the wireless device can be separate from the vehicle. For example, the wireless device can be associated with (e.g., carried by) the vehicle user. In such case, the wireless device can be considered a user equipment (UE). In other embodiments, the wireless device can be integrated with the vehicle. In such case, if the vehicle is part of a shared-vehicle service, the wireless device would not be associated with the vehicle user but rather with the service provider.

Other embodiments include wireless devices configured to perform operations corresponding to any of the exemplary methods described herein. Other embodiments include electric vehicles that include such wireless devices. Other embodiments include non-transitory, computer-readable media storing program instructions that, when executed by processing circuitry, configure such wireless devices to perform operations corresponding to any of the exemplary methods described herein.

These and other objects, features, and advantages of embodiments of the present disclosure will become apparent upon reading the following Detailed Description in view of the Drawings briefly described below.

DETAILED DESCRIPTION

Figure 2A:
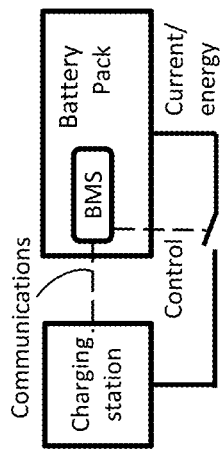
FIG. 2A shows an exemplary integration of the battery pack shown in FIG. 1 with a charging station host platform.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. Any feature of any of the embodiments disclosed herein can be applied to any other embodiment, wherever appropriate. Likewise, any advantage of any of the embodiments can apply to any other embodiments, and vice versa. Other objects, features, and advantages of the disclosed embodiments will be apparent from the following description.

Furthermore, the following terms are used throughout the description given below:

Radio Access Node: As used herein, a "radio access node" (or equivalently "radio network node," "radio access network node," or "RAN node") can be any node in a radio access network (RAN) of a cellular communications network that operates to wirelessly transmit and/or receive signals. Some examples of a radio access node include, but are not limited to, a base station (e.g., a New Radio (NR) base station (gNB) in a 3GPP Fifth Generation (5G) NR network or an enhanced or evolved Node B (eNB) in a 3GPP LTE network), base station distributed components (e.g., CU and DU), a high-power or macro base station, a low-power base station (e.g., micro, pico, femto, or home base station, or the like), an integrated access backhaul (IAB) node, a transmission point, a remote radio unit (RRU or RRH), and a relay node.

Core Network Node: As used herein, a "core network node" is any type of node in a core network. Some examples of a core network node include, e.g., a Mobility Management Entity (MME), a serving gateway (SGW), a Packet Data Network Gateway (P-GW), an access and mobility management function (AMF), a session management function (AMF), a user plane function (UPF), a Service Capability Exposure Function (SCEF), or the like.

Wireless Device: As used herein, a "wireless device" (or "WD" for short) is any type of device that has access to (i.e., is served by) a cellular communications network by communicate wirelessly with network nodes and/or other wireless devices. Communicating wirelessly can involve transmitting and/or receiving wireless signals using electromagnetic waves, radio waves, infrared waves, and/or other types of signals suitable for conveying information through air. Unless otherwise noted, the term "wireless device" is used interchangeably herein with "user equipment" (or "UE" for short). Some examples of a wireless device include, but are not limited to, smart phones, mobile phones, cell phones, voice over IP (VoIP) phones, wireless local loop phones, desktop computers, personal digital assistants (PDAs), wireless cameras, gaming consoles or devices, music storage devices, playback appliances, wearable devices, wireless endpoints, mobile stations, tablets, laptops, laptop-embedded equipment (LEE), laptop-mounted equipment (LME), smart devices, navigation devices, wireless customer-premise equipment (CPE), mobile-type communication (MTC) devices, Internet-of-Things (IoT) devices, vehicle-mounted wireless terminal devices, device-to-device (D2D) UEs, etc.

Network Node: As used herein, a "network node" is any node that is either part of the radio access network (e.g., a radio access node or equivalent name discussed above) or of the core network (e.g., a core network node discussed above) of a cellular communications network. Functionally, a network node is equipment capable, configured, arranged, and/or operable to communicate directly or indirectly with a wireless device and/or with other network nodes or equipment in the cellular communications network, to enable and/or provide wireless access to the wireless device, and/or to perform other functions (e.g., administration) in the cellular communications network.

Note that the following description is in the context of a 3GPP cellular communications system and, as such, 3GPP terminology (or equivalent) is often used. However, the concepts disclosed herein are not limited to a 3GPP system. Furthermore, although the term "cell" may be used herein, it should be understood that (particularly with respect to 5G) beams may be used instead of or in addition to cells and, as such, concepts described herein apply equally to both cells and beams.

As briefly mentioned above, given a starting point and a destination, some navigation applications can provide multiple route options, each associated with an estimated transit time. Some of these applications can also provide estimated transit times associated with different transit modes (e.g., car, bike, walk, public transport, etc.) for each route option. For vehicle-based transit modes, however, the estimated transit times do not consider vehicle limitations, such as conditions and/or capabilities of an EV's battery. This is discussed in more detail below.

Figure 1:
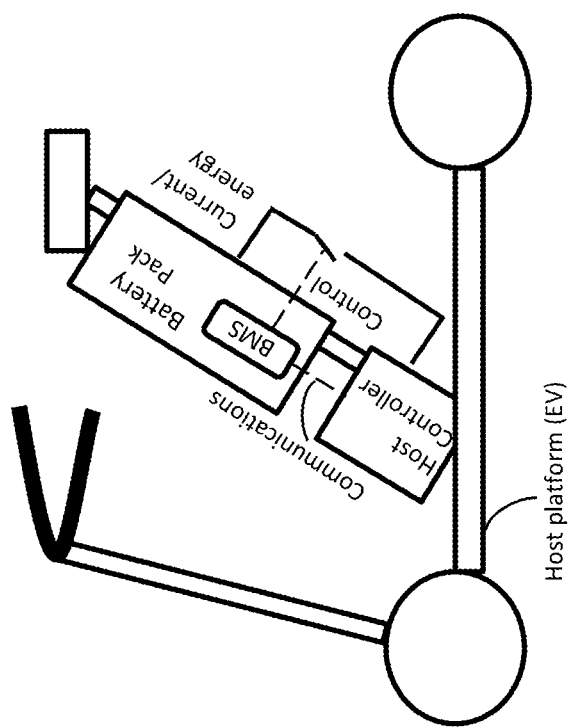
FIG. 1 shows an exemplary integration of a battery pack into a host platform (e.g., EV) according to conventional techniques.

FIG. 1 shows an exemplary integration of a battery pack into a host platform (e.g., EV) according to conventional techniques. Although the host platform/EV is illustrated in FIG. 1 as a scooter, this is only used to exemplify any type of EV, such as others described herein. As shown in FIG. 1, the host platform includes a host controller and the battery pack includes a BMS. The host controller can include one or more processors, memories, communication interfaces, etc. can be integrated into the host platform, e.g., as an electronics module. The host controller and BMS can communicate via a wired communications interface, such as any type of wired communications bus known to skilled persons to be suitable for this application.

The BMS can also control the flow of current and/or energy from the battery pack to the host platform. In general, the BMS can control this flow based on conditions internal to the battery pack and/or commands from the host controller via the communications interface. As discussed above, the current/energy flow and the communications interface can be on the same or different connectors on the battery pack.

As briefly mentioned above, electric vehicles (EVs) are increasingly being used in shared-vehicle services, including scooter-sharing services such as such as Lyme, Bird, etc. These services often include a large number of identical EVs with battery packs that are removable to facilitate charging, maintenance, and replacement. FIG. 2A shows an exemplary integration of the battery pack shown in FIG. 1 with a charging station host platform. In contrast to FIG. 1, the energy/current flow is from the charging station to the battery pack. The charging station can also communicate with the BMS via the communication interface. The charging station can be located in various places that may or may not be under the control of the battery pack manufacturer or the shared-vehicle service provider.

Figure 2B:
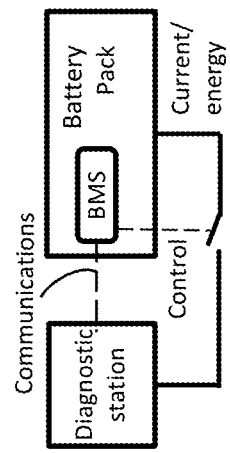
FIG. 2B shows an exemplary integration of the battery pack shown in FIG. 1 with a diagnostic station host platform.

FIG. 2B shows an exemplary integration of the battery pack shown in FIG. 1 with a diagnostics station host platform. The diagnostic station can also communicate with the BMS via the communication interface. The diagnostics station shown in FIG. 2B can be in the battery pack factory, in a manufacturer service depot, in a field service depot, etc., each of which may have different diagnostic and/or service capabilities. Depending on the arrangement, the energy/current flow in FIG. 2B may be in one or both directions, or may not occur (e.g., battery pack and diagnostic station are self-powered).

Each battery pack includes some number of rechargeable energy cells that can receive electric current from a host platform, store it as charge, and then deliver the stored charge as electric current to a host platform (e.g., EV). Each energy cell is rated at a nominal voltage, which is fixed by the electrochemical characteristics of the active chemicals used in the cell (e.g., "cell chemistry"). For example, Lithium Ion (Li-Ion) cells have a nominal voltage of 4.2V. However, the actual voltage appearing at the cell terminals at any particular time depends on the load current to the host platform as well as the cell's internal impedance, operating temperature, state of charge, and age.

Likewise, each cell is rated at a nominal discharge current (C), but typically can operate at discharge currents above and below the nominal (e.g., up to 5 C). Each cell also has a total charge capacity, which it typically given as a product of discharge current and time, e.g., amp-hours (A-h). However, the actual capacity of a cell can vary based on the discharge current. In other words, the actual capacity of the cell can decrease if it is discharged at very high current (e.g., 5 C), or can increase if it is discharged at very low current (e.g., 0.2 C). This effect is often referred to as "capacity offset."

The Peukert equation is one way to quantify the capacity offset of a cell, e.g., in terms of how the available capacity changes according to the rate of discharge. This relationship can be expressed as:

$$B = I^n \cdot T,$$

where B is the theoretical capacity of the battery (Ah); I is the discharge current (e.g., a multiple of C), T is time; and n is the Peukert Number, a constant that is directly related to the internal resistance of the particular cell used in the battery. An ideal battery corresponds to n=1. In general, the Peukert equation shows that at higher currents, the cell can provide less total energy to the host platform. The Peukert number indicates how well a battery performs under continuous heavy currents, with a value close to 1 indicating that the battery performs well but higher values indicating greater capacity offset.

The Peukert equation can also be arranged mathematically into the following form:

$$I \cdot T = C \cdot \left(\frac{C}{I \cdot H}\right)^{n-1},$$

where C is the nominal (or rated) discharge current (A), H is the discharge time (hours) at the nominal current C, I is the actual discharge current (A), and T is the actual discharge time (hours). In other words, a battery with nominal capacity C·H will have actual capacity I·T, where I·T C·H for I≠C.

Figure 3:
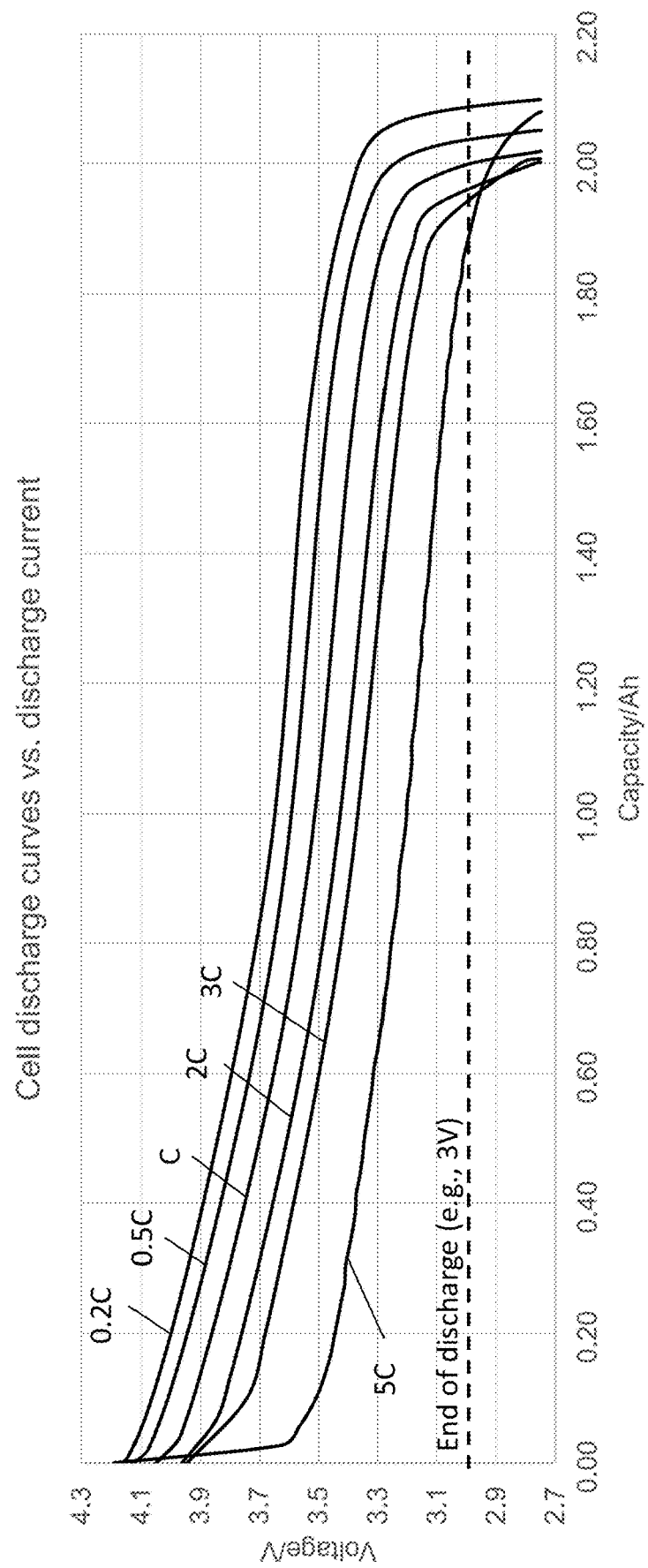
FIG. 3 shows an exemplary set of discharge curves for a lithium ion (Li-Ion) cell with 4.2V nominal voltage and nominal capacity of approximately 2.1 Amp-hour (Ah).

FIG. 3 shows an exemplary set of discharge curves for a Li-Ion cell with 4.2V nominal voltage and nominal charge capacity of approximately 2.1 A-h. The exemplary discharge curves—which collectively can be referred to as a "discharge profile"—show a range of cell behavior for discharge currents ranging from 0.2 C to 5 C. For lower discharge currents (e.g., 0.2 C), the actual voltage provided by the cell during discharge remains relatively high until nearly the entire capacity has been discharged, at which point the output voltage falls off rapidly. As the discharge rate increases, the actual voltage shifts downward for a given amount of discharge. For example, there is approximately 0.3V difference between 0.2 C and 3 C rates over much of the discharge range, and approximately 0.5V difference between 0.2 C and 5 C over the same discharge range.

The exemplary characteristics shown in FIG. 3 can also include an end-of-discharge voltage level, which in some cases can be 3V for a nominal 4.2V cell. A BMS may monitor the cells in a battery pack and stop discharge when the cells reach the end-of-discharge level, e.g., for safety reasons. In such case, the available capacity of the cell may also decrease as the discharge current increases. In the example shown in FIG. 3, the capacity decreases from ~2.1 A-h at 0.2 C to ~1.9 A-h at 5 C.

The instantaneous power delivered by discharging a cell is the product of the instantaneous discharge current and instantaneous cell voltage. The discharge energy delivered by discharging a cell is the sum of instantaneous power over time of discharge. In the context of the graph FIG. 3, the discharge energy for a particular discharge current is the area under the discharge curve associated with that discharge current. As such, even though instantaneous power generally increases with increasing discharge current, total discharge energy generally decreases with increasing discharge current. In FIG. 3, this is exemplified by the significant difference between the areas under the 0.2 C and 5 C curves. Moreover, this difference will be even greater if an end-of-discharge threshold limits the total available capacity.

One aspect of the Peukert equation not illustrated by FIG. 3 is discharge time. Even so, a skilled person will recognize that according to the Peukert equation, the duration required to reach end-of-discharge level will increase more than proportional to a decrease in discharge current. For example, the duration of the 0.5 C discharge curve shown in FIG. 3 is more than double the duration of the C (nominal) discharge curve.

Figure 4:
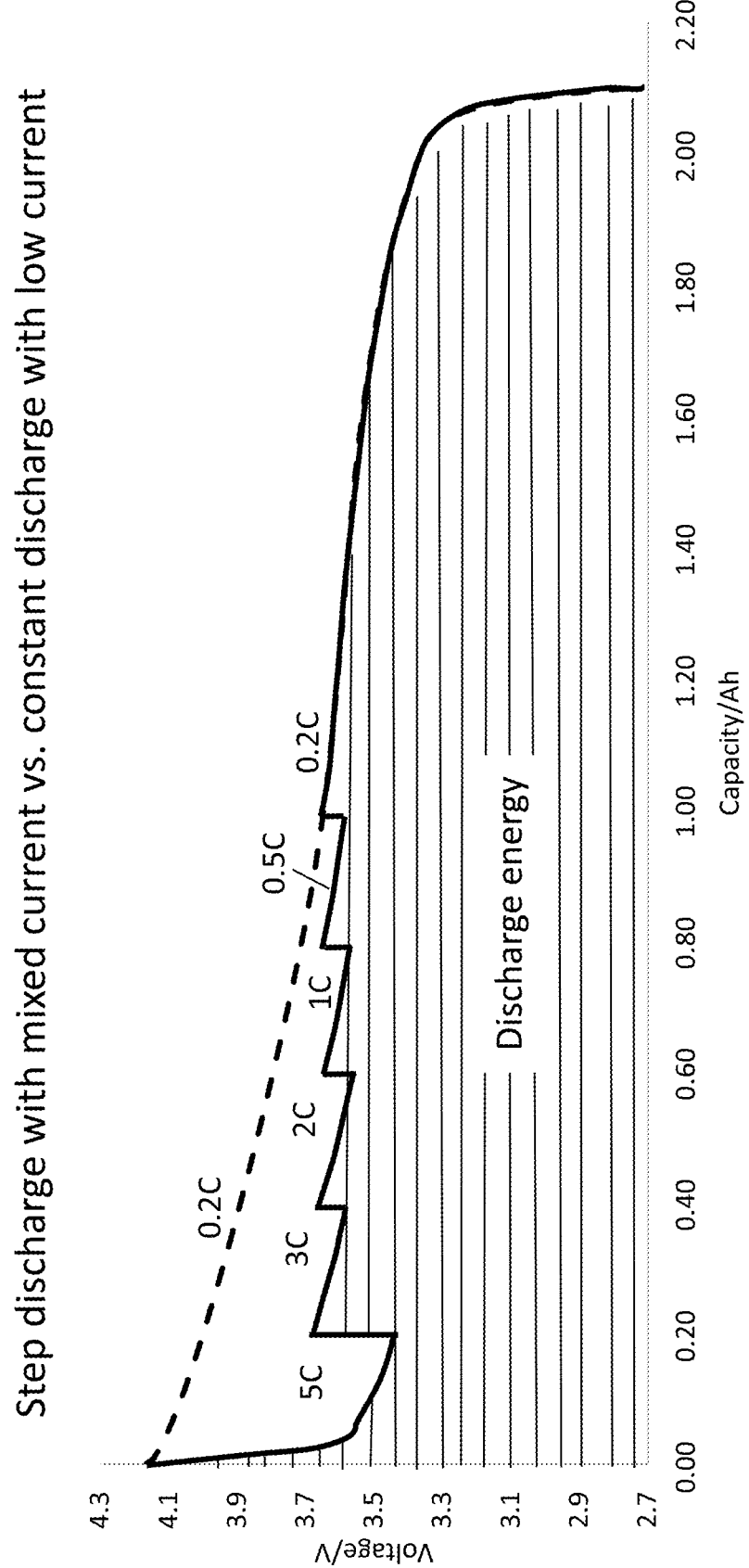
FIG. 4 shows an exemplary comparison of constant low-current discharge with mixed-current discharge for the same cell as FIG. 3.

Although FIG. 3 shows characteristics for various constant discharge currents, the instantaneous discharge current may vary over time for certain applications. As an example, instantaneous discharge currents for EV batteries may vary based on EV speed and acceleration, weight of the EV and any passengers/cargo, and environmental conditions. FIG. 4 shows an exemplary comparison of constant low-current discharge with mixed-current discharge. More specifically, FIG. 4 shows the 0.2 C discharge curve (in dashes) from FIG. 3 together with a step discharge arrangement of a sequence of all discharge curves (in solid) from FIG. 3. In the latter case, 0.2 A-h is discharged at each of five different currents—5 C, 3 C, 2 C, 1 C, 0.5 C, and 0.2 C, sequentially. Subsequently, discharge occurs at 0.2 C until battery capacity is exhausted. As can be seen in FIG. 4, more discharge energy is available at constant 0.2 C than at in the stepped discharge arrangement.

One of the environmental conditions that can significantly affect discharge rate for an EV battery is slope of the road. Assuming all other factors equal, the EV's electric motors need to provide more output power for increasingly uphill slopes, which in turn requires more current from the battery. In contrast, the EV's electric motors need to provide less output power for increasingly downhill slopes, which in turn requires less current from the battery. Due to the discharge offset effect discussed above, however, the amount of battery capacity required to carry an EV from a starting point to a destination will depend on the slope(s) on the route used.

Figure 5:
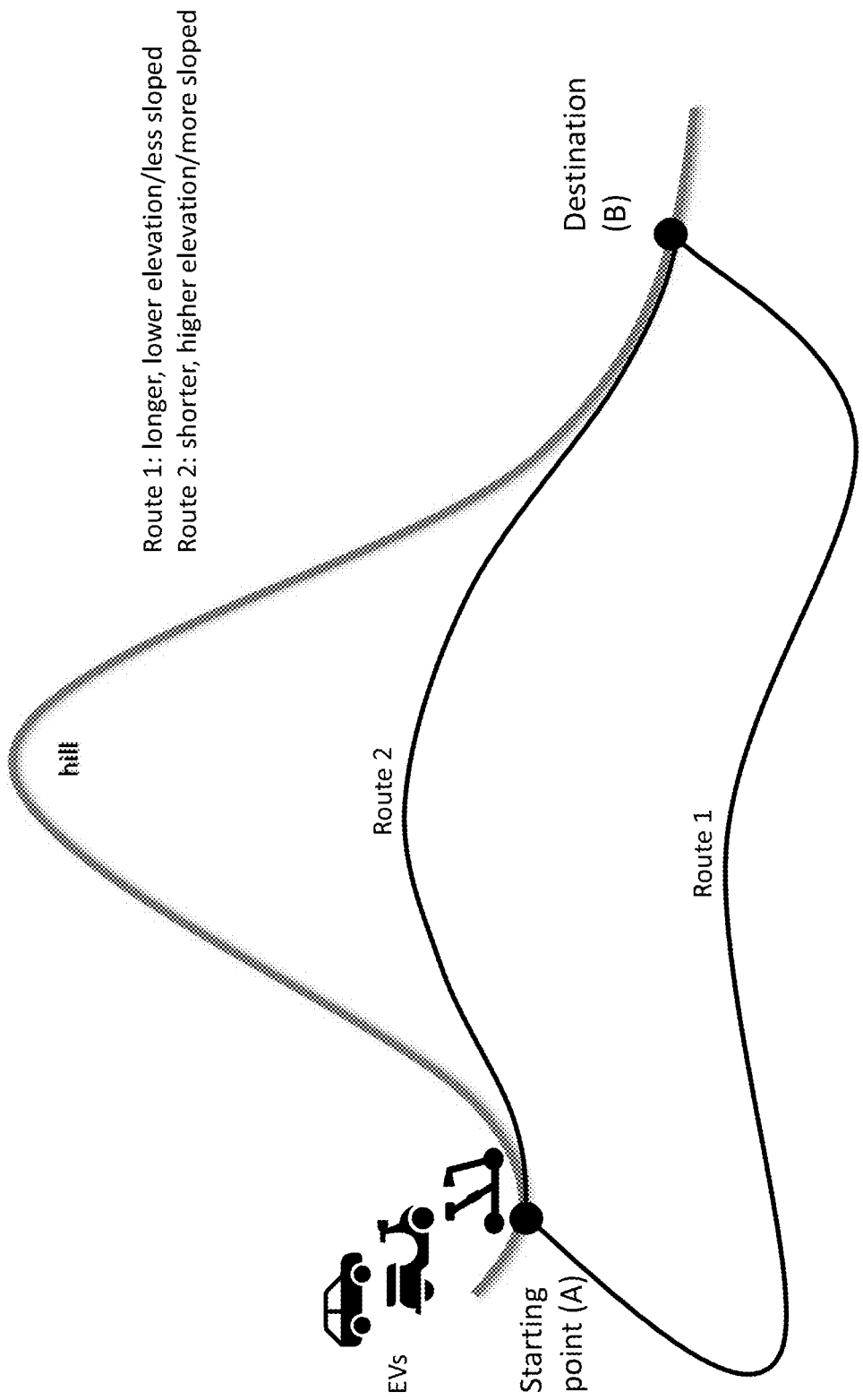
FIG. 5 illustrates two exemplary routes from a starting point (A) to a destination (B) in an environment with hilly terrain.

FIG. 5 illustrates two exemplary routes from a starting point (A) to a destination (B). Both routes are in an environment with hilly terrain but have different characteristics. For example, Route 1 is longer but generally remains at lower elevations in the hilly terrain, such that the EV has to climb relatively smaller uphill slopes. In contrast, Route 2 is shorter but traverses higher elevations in the hilly terrain, such that the EV must climb relatively larger uphill slopes.

Even so, the choice between Routes 1 and 2 is not entirely dependent on the uphill slopes of the respective routes. For example, even if Route 1 includes relatively smaller uphill slopes, it still may require a greater amount of battery capacity if Route 1 is significantly longer than Route 2. Likewise, even if Route 2 requires greater battery capacity than Route 1, it may still be preferable if the required capacity is greater than the EV's currently available battery capacity (also referred to as state of charge, SOC). This issues may affect EVs with relatively small battery capacities (e.g., scooters) more than EVs with relatively large battery capacities (e.g., cars, trucks).

Currently, navigation applications (e.g., Google Maps) can provide multiple route options, each associated with an estimated transit time. However, the estimated transit times do not consider vehicle capabilities and/or limitations when determining and/or suggesting routes. For example, conventional navigation applications do not consider an EV battery's SOC or discharge profile when determining routes. Furthermore, such applications do not consider the slope of routes (or route segments). Due to the discharge offset effect, however, the slope(s) of various route options can significantly impact route choice, particularly for EVs with relatively small battery capacities, such as scooters.

Furthermore, in shared-vehicle scenarios, such EVs may not be operating at full capacity due to previous usage since the last recharge of the battery. If a user selects an EV and chooses a route to a destination without regard to slope and SOC, the user may exhaust the battery capacity before reaching the destination.

Accordingly, exemplary embodiments of the present disclosure provide novel, flexible, and efficient techniques for determining a preferred route from a starting point to a destination for a vehicle powered by a battery, taking into account battery information (e.g., SOC and discharge profile) as well as the slope(s) of the various route options. Such techniques can be performed by a wireless device (or user equipment, UE) that can communicate wirelessly with the battery (e.g., the BMS) and/or the host platform. In some embodiments, the wireless device can also communicate with a remote database via a connection with a wide-area wireless network (e.g., cellular). In this manner, the wireless device can retrieve map information (including the slopes) from which the route(s) can be determined in conjunction with the battery information. In some embodiments, the wireless device can utilize a mapping and/or navigation application that performs the various disclosed operations. In some embodiments, the wireless device can also include the capability of determining its own position, such as by measurement of signals transmitted by satellites (e.g., GPS, GNSS, GLONASS, Galileo, BeiDou, etc.) or by the wide-area wireless network.

Such embodiments can provide various benefits and/or advantages. For example, embodiments can improve end-user experience for vehicle-sharing services, such as by avoiding EVs exhausting their battery capacity before the end user reaches their destination. As another example, embodiments can improve fleet management capabilities for vehicle-sharing service provides by improving and/or optimizing EV energy consumption by route selection, thereby reducing the frequency of recharging individual vehicles.

High-level operation of various embodiments can be summarized as follows. Based on geographic conditions in the region between a starting point and a destination (e.g., elevations, uphill slopes, downhill slopes, distances, etc. of various road segments) in combination with the SOC, discharge profile, and/or other parameters of the EV battery pack, embodiments can estimate and/or determine various aspects related to one or more preferred routes:

- Whether the EV can reach the destination from the starting point. For example, there may be a longer, less sloped route that allows the user to reach the destination (e.g., Route 1 in FIG. 5) but other shorter, more sloped routes over which the user is unlikely to reach the destination.
- One or more suggested vehicles for the route. For example, there may be several vehicles available at or near the starting point, each with a different SOC and/or discharge profile. Some may be suitable for all routes (e.g., Routes 1 and 2) because they are fully charged and/or have greater battery capacity, while others may be suitable only for certain routes (e.g., Route 1) because they are only partially charged and/or have less battery capacity.
- Estimate time of arrival based on SOCs and discharge profiles, in combination with estimated speed(s) on the respective routes. At a given slope, higher discharge current will generally increase vehicle speed and reduce duration of travel.
- In case the vehicle will not be able to reach the destination, provide the user with information about locations of charging stations in route, and/or locations in route where another EV (e.g., of the same service) is available for swapping. As such, the user can reach the destination but by using two vehicles instead of only the one selected at the starting point. Estimated duration of travel (or time of arrival) can also be updated based on vehicle swapping or recharging.

Figure 6:
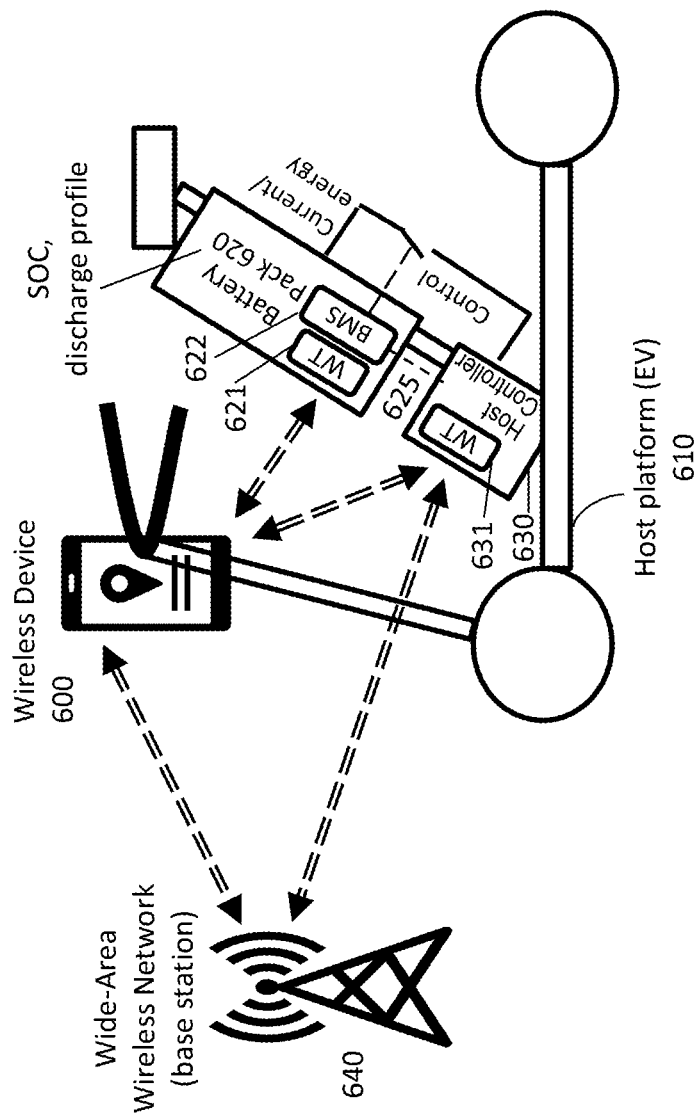
FIG. 6 shows an exemplary configuration of a wireless device used in conjunction with an EV host platform, according to various exemplary embodiments of the present disclosure.

FIG. 6 shows an exemplary configuration of a wireless device used in conjunction with an EV host platform, according to various exemplary embodiments of the present disclosure. In particular, FIG. 6 shows an EV 610 (which is illustrated as a scooter) that includes a battery pack 620 and a host controller 630. Battery pack 620 can include a BMS 622, which can communicate with host controller 630 over a communication bus 625. BMS 622 can also store a discharge profile and can determine a current SOC for battery pack 620. In general, BMS 622 can perform similar functions as other BMS discussed above, e.g., in relation to FIG. 1.

In some embodiments, battery pack 620 can also include a wireless transceiver (WT) 621. In some embodiments, host controller 631 can also include a WT 631. Either or both of WTs 621 and 631 can include a short-range WT (e.g., Bluetooth, NFC, etc.) that can be used to communicate with proximate devices, such as wireless device 600 discussed below. In some embodiments, WT 631 can include a long-range WT (e.g., cellular) that can be used to communicate with a network node in a wide-area wireless network 640, illustrated in FIG. 6 as a base station. Examples of such network nodes are shown in and described in relation to other figures herein. Although not shown, network 640 can also include, or be coupled to, a remote database (e.g., server) that stores positioning-related information, including various information that can be tr in conjunction with embodiments of the present disclosure.

Wireless device 600 can be a user equipment (UE) including a WT (not shown), which is also referred to as a radio transceiver, radio transceiver circuitry, or communication circuitry. By using this WT, the wireless device can communicate with network 640 and with one or both of WTs 621 and 631. For example, wireless device 600's WT can include a short-range WT (e.g., Bluetooth, NFC, etc.) that can be used to communicate with proximate devices (such as WTs 621 and/or 631), and a long-range WT (e.g., cellular) that can be used to communicate with network 640. Wireless device 600 can also include a display and processing circuitry that can perform various operations. Examples of such wireless devices are shown in and described in relation to other figures herein.

In some embodiments, wireless device 600 can communicate with the EV 610 or host controller 630 via a wired connection, such as a data communication bus on a compatible docking station (not shown in FIG. 6) for wireless device 600 on EV 610. The docking station can also be connected to host controller 630 via a wired or wireless connection. The docking station can also be removably attached or built into EV 610. In such embodiments, wireless device 600 can obtain status information about battery pack 620 and EV 610 via the wired connection to the docking station.

As mentioned above, the wireless device 600 can determine a preferred route for EV 610 from a starting point to a destination by taking into account battery information (e.g., SOC and discharge profile) as well as the slope(s) of the various route options. For example, this can be performed by an application (e.g., software) associated with the shared-vehicle service that is stored in memory of wireless device 600 and executed by processing circuitry. In some embodiments, such an application can be downloaded to the wireless device from a repository associated with the service provider or with another entity (e.g., application store). In other embodiments, the wireless device may be preconfigured with such an application.

Figure 7:
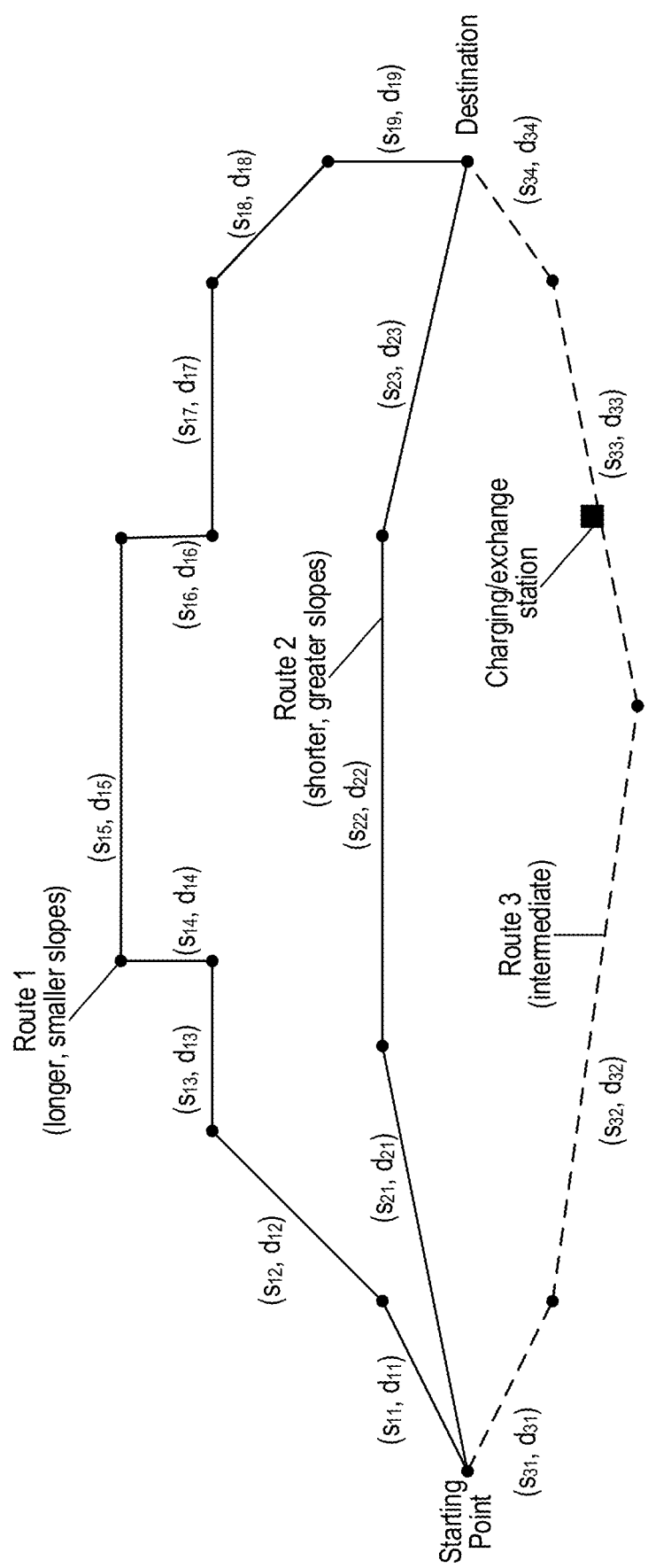
FIG. 7 shows an example of how different route options between a starting point and a destination can be characterized based on slope, according to various exemplary embodiments of the present disclosure.

FIG. 7 shows an example of how different route options between a starting point and a destination can be characterized based on slope. In particular, FIG. 7 shows three different routes (labelled 1, 2, and 3), each of which includes multiple route segments. Each route segment is associated with a slope/distance pair ($s_{ij}$, $d_{ij}$), which are respectively the slope and distance of the j-th segment of route i (i=1-3 in this example). Each segment can represent a change of direction, change of slope, etc. in relation to the previous segment of the same route (e.g., $s_{12}$ differs from $s_{11}$). In some cases, the segments of a route may be parts of different streets, roads, trails, etc.

In some embodiments, the slope/distance pairs for the various segments can be included in and/or determined from a map database that covers a geographic area surrounding the respective routes. Exemplary formats of map databases include ESRI shapefile, Geographic JavaScript Object Notation (GeoJSON), Geography Markup Language (GML), Keyhole Markup Language (KML), GPS eXchange Format (GPX), OpenStreetMap XML (OSM), etc.

Various routes from the starting point to the destination can include different numbers of segments. As shown in FIG. 7, Route 1 includes nine (9) segments, Route 3 includes four (4) segments, and Route 2 includes three (3) segments. In addition, route 3 includes a charging and/or exchange station along segment 3. At a high level, Routes 1-2 have characteristics similar to the characteristics of Routes 1-2 in FIG. 5, respectively, while Route 3 is an option not shown in FIG. 5.

The three routes shown in FIG. 7 can be candidate routes from the starting point to the destination. Depending on starting point, destination, and area therebetween, there may be more than the three routes, but the three routes are selected as candidates based on certain criteria. The wireless device can also determine a current state of charge (SOC) and a discharge profile for the battery, e.g., based on communication with host controller 630 and/or battery pack 620. This communication can be via direct short-range wireless connection to WT 631 and/or 621, or can be indirect via network 640 (e.g., if WT 631 is capable of communicating with network 640).

Given the battery status information and the slope-distance pairs for the segments of the respective routes, the wireless device can estimate battery discharge amounts (b), speeds (v), and durations of travel (T) for the respective segments. This can be represented as $(s_{ij}, d_{ij}) \rightarrow (b_{ij}, v_{ij}, T_{ij})$, where i and j have the same meaning as above.

In some embodiments, the wireless device can estimate a battery discharge amount (b) for each segment by determining a plurality of (e.g., K) candidate tuples, $\{(b_{ij}^{(1)}, v_{ij}^{(1)}, T_{ij}^{(1)}), \ldots (b_{ij}^{(K)}, v_{ij}^{(K)}, T_{ij}^{(K)})\}$, where the superscript indicates the index of the candidate tuple for the segment. Each candidate tuple can also be viewed as a candidate segment speed-duration pair $(v_{ij}^{(k)}, T_{ij}^{(k)})$ with an associated segment battery discharge amount $b_{ij}^{(k)}$. For example, each candidate segment speed $v_{ij}^{(k)}$ can be associated with one of the discharge current levels $c_k$ of the battery's discharge profile (e.g., 0.2 C, 0.5 C, etc.). Each candidate segment speed $v_{ij}^{(k)}$ can also be related to the segment slope $s_{ij}$. For example, each current level $c_k$ of the discharge profile can produce a corresponding segment speed $v_{ij}^{(k)}$ for a segment slope $s_{ij}$, as discussed above.

Each candidate segment duration of travel $T_{ij}^{(k)}$ can be calculated based on the candidate segment speed $v_{ij}^{(k)}$ and the segment distance $d_{ij}$, e.g., as a product of these terms. Put simply, the candidate segment duration of travel indicates approximately how long it will take to travel the segment distance at the candidate segment speed.

The wireless device can determine the segment battery discharge amount $b_{ij}^{(k)}$ for each candidate speed-duration pair $(v_{ij}^{(k)}, T_{ij}^{(k)})$ in various ways. As mentioned above, each candidate segment speed $v_{ij}^{(k)}$ can be associated with a discharge current level, $c_k$. Furthermore, within the discharge profile, each discharge current level, $c_k$, can be associated with a discharge time, $t_k$, according to Peukert's equation (above). In general, a candidate segment battery discharge amount $b_{ij}^{(k)}$ can be determined as a function of the discharge current level, $c_k$; the associated discharge time, $t_k$, and/or the Peukert number, n; and the candidate segment duration $T_{ij}^k$. For example, this amount can represent a portion of the nominal battery capacity (e.g., C·H) that is depleted by discharge current level $c_k$ for the duration $T_{ij}^{(k)}$, taking into account battery characteristics represented by Peukert number, n. An exemplary function for determining $b_{ij}^{(k)}$ is:

$$b_{ij}^{(k)} = c_k \cdot T_{ij}^{(k)} \cdot \left(\frac{c_k}{C}\right)^n,$$

where C is the nominal (or rated) discharge current.

Given K candidate tuples $\{(b_{ij}^{(1)}, v_{ij}^{(1)}, T_{ij}^{(1)}), \ldots (b_{ij}^{(K)}, v_{ij}^{(K)}, T_{ij}^{(K)})\}$ for each segment, the wireless device can select one of the K candidate tuples for each segment based on one or more criteria. These can include minimum segment battery discharge amount, minimum segment duration of travel, minimum segment battery discharge amount subject to a segment duration of travel less than a first threshold, and/or minimum segment duration of travel subject to a segment battery discharge amount less than a second threshold. Other criteria can also be incorporated into the selection procedure.

Given the selected tuples ($b_{ij}$, $v_{ij}$, $T_{ij}$) for the respective segments of the candidate routes, the wireless device can determine, for each candidate route:
- a route battery discharge amount $b_i$ based on a sum of the segment battery discharge amounts $b_{ij}$ for the respective segments of the candidate route; and
- a route duration of travel $T_i$ based on a sum of the segment durations of travel $T_{ij}$ for the respective segments of the candidate route.

The wireless device can then select the one or more preferred routes based on the respective route battery discharge amounts $b_i$ and the respective route durations of travel $T_i$. For example, the selected one or more preferred routes can be the candidate routes having the minimum route durations of travel and one or more of the following:
- total battery discharge amount less than the current SOC,
- availability of charging stations for recharging the battery, and
- availability of exchange stations for exchanging the vehicle or the battery.

Other criteria can be used for the selection instead of, or in addition to, the above criteria.

In the context of the arrangement shown in FIG. 7, the wireless device may select as "preferred routes" one or two of the three candidate routes shown. For example, for route durations $T_2 < T_3 < T_1$ but $b_2 > b_3 > SOC > b_1$, the wireless device may prefer Routes 1 and/or 3 due to SOC > $b_1$ and availability of charging/exchange along that Route 3 even though $b_2 > SOC$. If two routes are selected as preferred, the final route selection may be received from the user based on displayed characteristics of the two routes.

In some embodiments, the service provider may configure the wireless device (e.g., an application client) to select a preferred route that includes a charging/exchange station, because a user choosing this route can transport an EV to a charging/exchange station, which would save the service provider the normal expense associated with EV transport for these purposes. In some embodiments, the service provider may configure the wireless device (e.g., the application client) to indicate a user incentive associated with a preferred route that includes a charging/exchange station, such as a service credit, points in an affinity program, etc. In other words, the user only receives the indicated incentive if they select and use the preferred route that includes the station.

The embodiments described above can be further illustrated with reference to FIG. 8, which shows an exemplary method (e.g., procedures) for a wireless device. Put differently, various features of the operations described below correspond to various embodiments described above.

Figure 8:
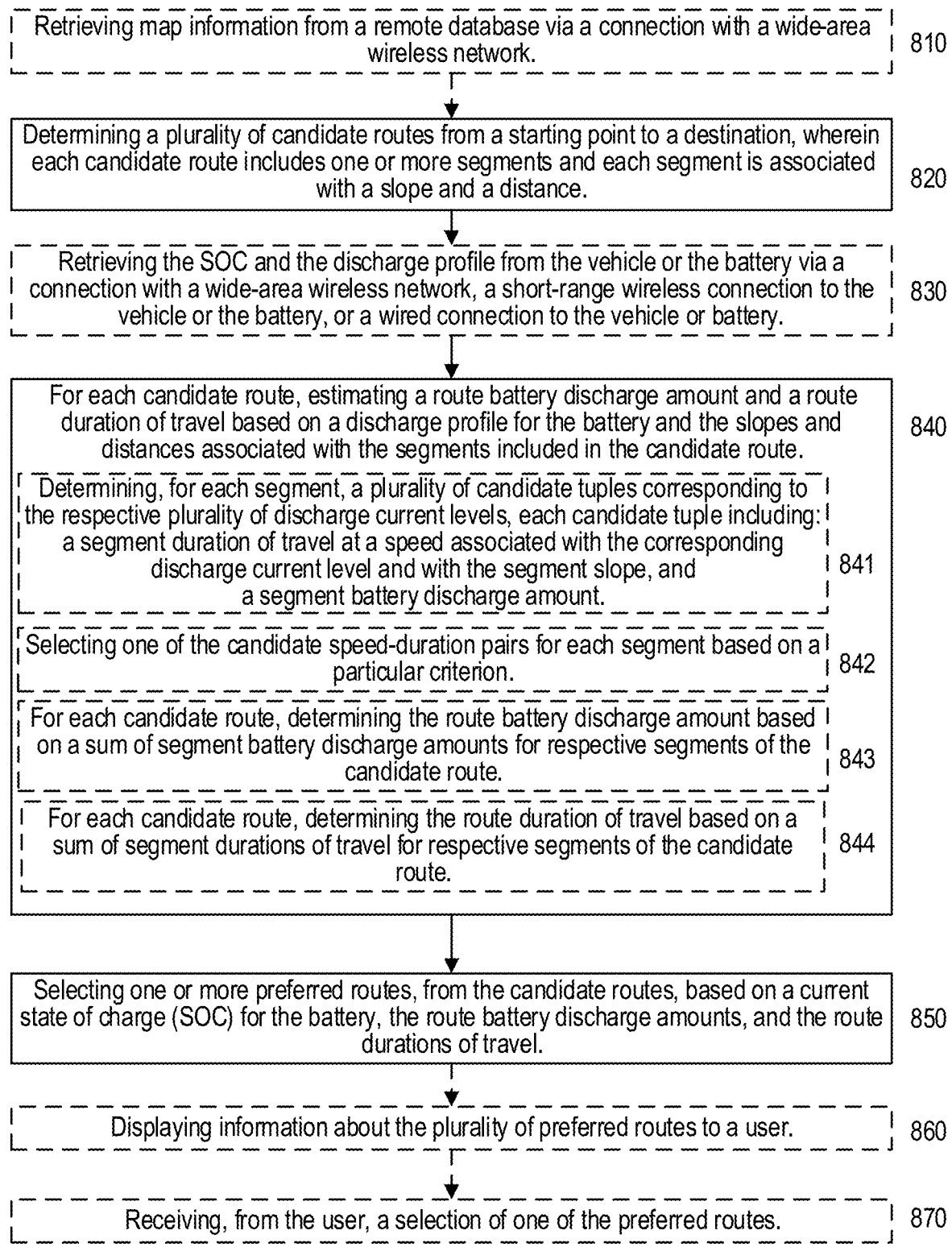
FIG. 8 shows a flow diagram of an exemplary method performed by a wireless device (e.g., user equipment), according to various exemplary embodiments of the present disclosure.

In particular, FIG. 8 shows a flow diagram of an exemplary method (e.g., procedure) for determining one or more preferred routes for an electric vehicle (e.g., car, truck, scooter, motorcycle, etc.) powered by a battery, according to various exemplary embodiments of the present disclosure. For example, the exemplary method shown in FIG. 8 can be implemented in a wireless device configured according to other figures described herein. Although FIG. 8 shows specific blocks in a particular order, the operations of the exemplary method can be performed in a different order than shown and can be combined and/or divided into blocks with different functionality than shown. Optional blocks or operations are indicated by dashed lines.

The exemplary method can include the operations of block 820, where the wireless device can determine a plurality of candidate routes from the starting point to the destination. Each candidate route can include a plurality of segments, with each segment being associated with a slope and a distance. The exemplary method can also include the operations of block 840, where the wireless device can estimate, for each candidate route, a route battery discharge amount and a route duration of travel based on a discharge profile for the battery and the slopes and distances associated with the segments included in the candidate route. The exemplary method can also include the operations of block 850, where the wireless device can select one or more preferred routes, from the candidate routes, based on a current state of charge (SOC) for the battery, the route battery discharge amounts, and the route durations of travel.

In some embodiments, the discharge profile can include a plurality of discharge current levels (and optionally, associated discharge times in accordance with the Peukert equation). In such embodiments, the estimating operations of block 840 can include the operations of sub-block 841 for each segment. In sub-block 841, the wireless device can determine a plurality of candidate tuples corresponding to the respective plurality of discharge current levels. Each candidate tuple can include:
- a segment duration of travel at a speed associated with the corresponding discharge current level and with the segment slope, and
- a segment battery discharge amount.

For example, a segment battery discharge amount can represent the amount of charge (e.g., Ah) and/or energy (e.g., V-Ah) depleted from the battery over the corresponding segment duration of travel. Note that any segment battery discharge amount should be less than the current SOC of the battery (e.g., actual or estimated) at the beginning of the segment duration. In some embodiments, if a determined segment battery discharge amount is greater than the current SOC, then the wireless device can eliminate the candidate tuple from further consideration.

In some of these embodiments, the estimating operations of block 840 can include the operations of sub-block 842, where the wireless device can select one of the candidate tuples for each segment based on one of the following criteria: minimum segment battery discharge amount; minimum segment duration of travel; minimum segment battery discharge amount subject to a segment duration of travel less than a first threshold; or minimum segment duration of travel subject to a segment battery discharge amount less than a second threshold. For example, the second threshold can be the current SOC or a percentage of the current SOC (e.g., 90%).

In some embodiments, the estimating operations of block 840 can also include the operations of sub-blocks 843-844. In sub-block 843, the wireless device can, for each candidate route, determine the route battery discharge amount based on a sum of segment battery discharge amounts for the respective segments of the candidate route. In sub-block 844, the wireless device can, for each candidate route, determine the route duration of travel based on a sum of segment durations of travel for the respective segments of the candidate route. For example, the segment battery discharge amounts and segment durations of travel can correspond to the candidate tuples selected for the respective segments (e.g., in sub-block 842).

In some embodiments, the one or more preferred routes (e.g., selected in block 850) can be candidate routes having minimum route durations of travel and at least one of the following:
- route battery discharge amounts less than the current SOC,
- charging stations for recharging the battery, and exchange stations for exchanging the vehicle or the battery.

In some embodiments, the one or more preferred routes can include a plurality of preferred routes. In such embodiments, the exemplary method can also include the operations of blocks 860-870. In block 860, the wireless device can display information about the plurality of preferred routes to a user. The displayed information for each preferred route can includes a route duration of travel and an indication of whether the route can be completed with the current SOC. In block 870, the wireless device can receive, from the user, a selection of one of the preferred routes. As an example, the wireless device can display the information (in block 860) on a touch screen display, and the user can indicate the selection by touching the display in an area associated with the selected route.

In some embodiments, the displayed information (e.g., in block 860) for each preferred route can also include one or more of the following:
  locations for one or more charging stations in relation to the preferred route;
  occupancy or availability of the charging stations;
  charging capability of the charging stations; and
  any user incentives associated with the preferred route.
In some embodiments, the displayed information (e.g., in block 860) for each preferred route can also include one or more of the following:
  locations for one or more exchange stations in relation to the preferred route;
  inventory of vehicles or batteries available for exchange at the exchange stations;
  SOC of the vehicles or batteries available for exchange at the exchange stations;
  one or more recommended vehicles or batteries available for exchange at the exchange stations; and
  any user incentives associated with the preferred route.
For example, some or all of this displayed information concerning the routes, charging stations, and/or exchange stations can be obtained from the vehicle and/or by communication with a shared-vehicle service provider.

In some embodiments, the exemplary method can also include the operations of block 810, where the wireless device can retrieve map information from a remote database via a connection with a wide-area wireless network. The plurality of routes can be determined based on the retrieved map information. This can be done based on various known techniques.

In some embodiments, the retrieved map information can include the slope and the distance associated with the respective segments. In other embodiments, the map information can include elevation information from which the wireless device can determine the respective slopes. In such embodiments, the determining operations of block 820 can include the operations of sub-block 821, where the wireless device can determine the slopes associated with the respective segments of the candidate routes based on slope information and/or elevation information included in the map information.

In other embodiments, the wireless device can determine the slope and/or distance information based on other information stored in the wireless device or retrieved by the wireless device from other sources coupled to the wide-area wireless network.

In some embodiments, the exemplary method can also include the operations of block 830, where the wireless device can retrieve the SOC and the discharge profile from the vehicle or the battery via a connection with a wide-area wireless network, a short-range wireless connection to the vehicle or the battery, or a wired connection to the vehicle or the battery. Wireless connections can be facilitated by compatible wireless transceivers (WTs) in the wireless device, battery, vehicle, and/or wireless network, while a wired connection can be facilitated by a data communications bus to which both communicating entities are connected.

In some embodiments, the wireless device can be separate from the vehicle. For example, the wireless device can be associated with (e.g., carried by) the vehicle user. In such case, the wireless device can be considered a user equipment (UE). In other embodiments, the wireless device can be integrated with the vehicle. In such case, if the vehicle is part of a shared-vehicle service, the wireless device would not be associated with the vehicle user but rather with the service provider. Note that in either case, the term "wireless device" is used in accordance with its definition herein and does not imply a device that lacks any wired connections (e.g., power, audio, etc.).

Although various embodiments are described above in terms of methods, techniques, and/or procedures, the person of ordinary skill will readily comprehend that such methods, techniques, and/or procedures can be embodied by various combinations of hardware and software in various systems, communication devices, computing devices, control devices, apparatuses, non-transitory computer-readable media, computer program products, etc. Some example implementations are described in more detail below.

Long Term Evolution (LTE) is an umbrella term for so-called fourth-generation (4G) radio access technologies developed within the Third-Generation Partnership Project (3GPP) and initially standardized in Release 8 (Rel-8) and Release 9 (Rel-9), also known as Evolved UTRAN (E-UTRAN). LTE is targeted at various licensed frequency bands and is accompanied by improvements to non-radio aspects commonly referred to as System Architecture Evolution (SAE), which includes Evolved Packet Core (EPC) network. LTE continues to evolve through subsequent releases.

LTE Rel-10 supports bandwidths larger than 20 MHz. One important requirement on Rel-10 is to backward compatibility with LTE Rel-8. This also includes spectrum compatibility in which a wideband LTE Rel-10 carrier (e.g., wider than 20 MHz) should appear as multiple carriers to an LTE Rel-8 ("legacy") terminal ("user equipment" or UE). Each such carrier can be referred to as a Component Carrier (CC). For efficient usage, legacy terminals can be scheduled in all parts of the wideband LTE Rel-10 carrier. This can be done by Carrier Aggregation (CA), in which a Rel-10 terminal receives multiple CCs, each having the same structure as a Rel-8 carrier. LTE Rel-12 introduced dual connectivity (DC) whereby a UE can be connected to two network nodes simultaneously, thereby improving connection robustness and/or capacity.

Currently the fifth generation ("5G") of cellular systems, also referred to as New Radio (NR), is being standardized within the Third-Generation Partnership Project (3GPP). NR is developed for maximum flexibility to support multiple and substantially different use cases. These include enhanced mobile broadband (eMBB), machine type communications (MTC), ultra-reliable low latency communications (URLLC), side-link device-to-device (D2D), and several other use cases.

Fifth-generation NR technology shares many similarities with fourth-generation LTE. For example, NR uses CP-OFDM (Cyclic Prefix Orthogonal Frequency Division Multiplexing) in the downlink (DL) and both CP-OFDM and DFT-spread OFDM (DFT-S-OFDM) in the uplink (UL). As another example, in the time domain, NR DL and UL physical resources are organized into equal-sized 1-ms subframes. A subframe is further divided into multiple slots of equal duration, with each slot including multiple OFDM-based symbols. In addition to providing coverage via cells, as in LTE, NR networks also provide coverage via "beams." In general, a DL "beam" is a coverage area of a network-transmitted RS that may be measured or monitored by a user equipment (UE, e.g., wireless device).

To support increased traffic capacity and to enable the transmission bandwidth needed to support very high data rate services, 5G will extend the range of frequencies used for mobile communication. This includes new spectrum below 6 GHz (referred to as "FR1"), as well as spectrum in higher frequency bands above 24 GHz (referred to as "FR2").

3GPP standards provide various ways for positioning (e.g., determining the position of, locating, and/or determining the location of) UEs operating in LTE networks. In general, an LTE positioning node (referred to as "E-SMLC" or "location server") configures the target device (e.g., UE), an eNB, or a radio network node dedicated for positioning measurements (e.g., a "location measurement unit" or "LMU") to perform one or more positioning measurements according to one or more positioning methods. For example, the positioning measurements can include timing (and/or timing difference) measurements on UE, network, and/or satellite transmissions. The positioning measurements are used by the target device (e.g., UE), the measuring node, and/or the E-SMLC to determine the location of the target device.

UE positioning is also expected to be an important feature for NR networks, which will support positioning methods similar to those in LTE but based on NR measurements. NR may also support other position methods such as downlink angle of departure (DL-AoD), uplink angle of arrival (UL-AoA), and multiple round-trip-time (Multi-RTT).

Figure 9:
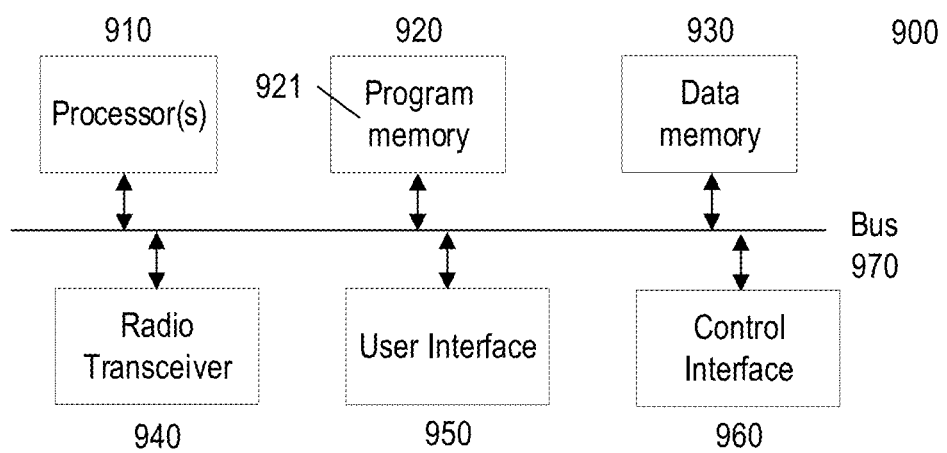
FIG. 9 shows a block diagram of an exemplary wireless device or user equipment (UE), according to various exemplary embodiments of the present disclosure.

FIG. 9 shows a block diagram of an exemplary wireless device or user equipment (UE) 900 (hereinafter referred to as "UE 900") according to various embodiments of the present disclosure, including those described above with reference to other figures. For example, UE 900 can be configured by execution of instructions, stored on a computer-readable medium, to perform operations corresponding to any of the exemplary methods described herein.

UE 900 can include a processor 910 (also referred to as "processing circuitry") that can be operably connected to a program memory 920 and/or a data memory 930 via a bus 970 that can comprise parallel address and data buses, serial ports, or other methods and/or structures known to those of ordinary skill in the art. Program memory 920 can store software code, programs, and/or instructions (collectively shown as computer program product 921 in FIG. 9) that, when executed by processor 910, can configure and/or facilitate UE 900 to perform various operations, including operations corresponding to various exemplary methods described herein. As part of or in addition to such operations, execution of such instructions can configure and/or facilitate UE 900 to communicate using one or more wired or wireless communication protocols, including one or more wireless communication protocols standardized by 3GPP, IEEE, or other standards-setting organizations (SSOs). Such protocols include those commonly known as 5G (including NR and NR-Unlicensed), 4G (including LTE, LTE-Advanced, LTE-LAA, etc.), 3G (including UMTS, HSPA, etc.), 2G (including GSM, GPRS, EDGE, 1xRTT, CDMA2000, etc.), 802.11 WiFi (and variants), HDMI, USB, Firewire, etc. However, skilled persons will recognize that there may be other current or future protocols compatible for use with radio transceiver 940, user interface 950, and/or control interface 960.

As another example, processor 910 can execute program code stored in program memory 920 that corresponds to MAC, RLC, PDCP, and RRC layer protocols standardized by 3GPP (e.g., for 4G, 5G, etc.). As a further example, processor 910 can execute program code stored in program memory 920 that, together with radio transceiver 940, implements corresponding PHY layer protocols, such as Orthogonal Frequency Division Multiplexing (OFDM), Orthogonal Frequency Division Multiple Access (OFDMA), and Single-Carrier Frequency Division Multiple Access (SC-FDMA). As another example, processor 910 can execute program code stored in program memory 920 that, together with radio transceiver 940, implements device-to-device (D2D) communications with other compatible devices and/or UEs.

Program memory 920 can also include software code executed by processor 910 to control the functions of UE 900, including configuring and controlling various components such as radio transceiver 940, user interface 950, and/or control interface 960. Program memory 920 can also comprise one or more application programs and/or modules comprising computer-executable instructions embodying any of the exemplary methods described herein. Such software code can be specified or written using any known or future developed programming language, such as e.g., Java, C++, C, Objective C, HTML, XHTML, machine code, and Assembler, as long as the desired functionality, e.g., as defined by the implemented method steps, is preserved. In addition, or as an alternative, program memory 920 can comprise an external storage arrangement (not shown) remote from UE 900, from which the instructions can be downloaded into program memory 920 located within or removably coupled to UE 900, so as to enable execution of such instructions.

Data memory 930 can include memory area for processor 910 to store variables used in protocols, configuration, control, and other functions of UE 900, including operations corresponding to, or comprising, any of the exemplary methods described herein. Moreover, program memory 920 and/or data memory 930 can include non-volatile memory (e.g., flash memory), volatile memory (e.g., static or dynamic RAM), or a combination thereof. Furthermore, data memory 930 can comprise a memory slot by which removable memory cards in one or more formats (e.g., SD Card, Memory Stick, Compact Flash, etc.) can be inserted and removed.

Persons of ordinary skill will recognize that processor 910 can include multiple individual processors (including, e.g., multi-core processors), each of which implements a portion of the functionality described above. In such cases, multiple individual processors can be commonly connected to program memory 920 and data memory 930 or individually connected to multiple individual program memories and or data memories. More generally, persons of ordinary skill in the art will recognize that various protocols and other functions of UE 900 can be implemented in many different computer arrangements comprising different combinations of hardware and software including, but not limited to, application processors, signal processors, general-purpose processors, multi-core processors, ASICs, fixed and/or programmable digital circuitry, analog baseband circuitry, radio-frequency circuitry, software, firmware, and middleware.

Radio transceiver 940 can include radio-frequency transmitter and/or receiver functionality that facilitates the UE 900 to communicate with other equipment supporting like wireless communication standards and/or protocols. In some exemplary embodiments, the radio transceiver 940 includes one or more transmitters and one or more receivers that enable UE 900 to communicate according to various protocols and/or methods proposed for standardization by 3GPP and/or other standards bodies. For example, such functionality can operate cooperatively with processor 910 to implement a PHY layer based on OFDM, OFDMA, and/or SC-FDMA technologies, such as described herein with respect to other figures.

In some exemplary embodiments, radio transceiver 940 includes one or more transmitters and one or more receivers that can facilitate the UE 900 to communicate with various LTE, LTE-Advanced (LTE-A), and/or NR wide-area wireless networks according to standards promulgated by 3GPP. In some exemplary embodiments of the present disclosure, the radio transceiver 940 includes circuitry, firmware, etc. necessary for the UE 900 to communicate with various NR, NR-U, LTE, LTE-A, LTE-LAA, UMTS, and/or GSM/EDGE wide-area wireless networks, also according to 3GPP standards. In some embodiments, radio transceiver 940 can include circuitry supporting D2D communications between UE 900 and other compatible devices.

In some embodiments, radio transceiver 940 includes circuitry, firmware, etc. necessary for the UE 900 to communicate with various CDMA2000 networks, according to 3GPP2 standards. In some embodiments, the radio transceiver 940 can be capable of communicating using radio technologies that operate in unlicensed frequency bands, such as IEEE 802.11 WiFi that operates using frequencies in the regions of 2.4, 5.6, and/or 60 GHz. In some embodiments, radio transceiver 940 can include a transceiver that is capable of wired communication via a digital communications bus, such as by IEEE 802.3 Ethernet or Universal Serial Bus (USB) technology. The functionality particular to each of these embodiments can be coupled with and/or controlled by other circuitry in the UE 900, such as the processor 910 executing program code stored in program memory 920 in conjunction with, and/or supported by, data memory 930.

User interface 950 can take various forms depending on the particular embodiment of UE 900, or can be absent from UE 900 entirely. In some embodiments, user interface 950 can comprise a microphone, a loudspeaker, slidable buttons, depressible buttons, a display, a touchscreen display, a mechanical or virtual keypad, a mechanical or virtual keyboard, and/or any other user-interface features commonly found on mobile phones. In other embodiments, the UE 900 can comprise a tablet computing device including a larger touchscreen display. In such embodiments, one or more of the mechanical features of the user interface 950 can be replaced by comparable or functionally equivalent virtual user interface features (e.g., virtual keypad, virtual buttons, etc.) implemented using the touchscreen display, as familiar to persons of ordinary skill in the art. In other embodiments, the UE 900 can be a digital computing device, such as a laptop computer, desktop computer, workstation, etc. that comprises a mechanical keyboard that can be integrated, detached, or detachable depending on the particular exemplary embodiment. Such a digital computing device can also comprise a touch screen display. Many exemplary embodiments of the UE 900 having a touch screen display are capable of receiving user inputs, such as inputs related to exemplary methods described herein or otherwise known to persons of ordinary skill.

In some embodiments, UE 900 can include an orientation sensor, which can be used in various ways by features and functions of UE 900. For example, the UE 900 can use outputs of the orientation sensor to determine when a user has changed the physical orientation of the UE 900's touch screen display. An indication signal from the orientation sensor can be available to any application program executing on the UE 900, such that an application program can change the orientation of a screen display (e.g., from portrait to landscape) automatically when the indication signal indicates an approximate 90-degree change in physical orientation of the device. In this exemplary manner, the application program can maintain the screen display in a manner that is readable by the user, regardless of the physical orientation of the device. In addition, the output of the orientation sensor can be used in conjunction with various exemplary embodiments of the present disclosure.

A control interface 960 of the UE 900 can take various forms depending on the particular exemplary embodiment of UE 900 and of the particular interface requirements of other devices that the UE 900 is intended to communicate with and/or control. For example, the control interface 960 can comprise an RS-232 interface, a USB interface, an HDMI interface, a Bluetooth interface, a near-field communications (NFC) interface, an IEEE ("Firewire") interface, an I²C interface, a PCMCIA interface, or the like. In some exemplary embodiments of the present disclosure, control interface 960 can comprise an IEEE 802.3 Ethernet interface such as described above. In some exemplary embodiments of the present disclosure, the control interface 960 can comprise analog interface circuitry including, for example, one or more digital-to-analog converters (DACs) and/or analog-to-digital converters (ADCs).

In certain embodiments, UE 900 can use control interface 960 for short-range wireless communications (e.g., connections) with other compatible devices. For example, when control interface 960 includes Bluetooth and/or NFC interfaces, UE 900 can communicate with proximate devices having compatible Bluetooth and/or NFC interfaces. Such communication can facilitate various operations by UE 900, such as in relation to various methods (e.g., procedures) described herein.

Persons of ordinary skill in the art can recognize the above list of features, interfaces, and radio-frequency communication standards is merely exemplary, and not limiting to the scope of the present disclosure. In other words, the UE 900 can comprise more functionality than is shown in FIG. 9 including, for example, a video and/or still-image camera, microphone, media player and/or recorder, etc. Moreover, radio transceiver 940 can include circuitry necessary to communicate using additional radio-frequency communication standards including Bluetooth, GPS, and/or others. Moreover, the processor 910 can execute software code stored in the program memory 920 to control such additional functionality. For example, directional velocity and/or position estimates output from a GPS receiver can be available to any application program executing on the UE 900, including any program code corresponding to and/or embodying any exemplary embodiments (e.g., of methods) described herein.

Figure 10:
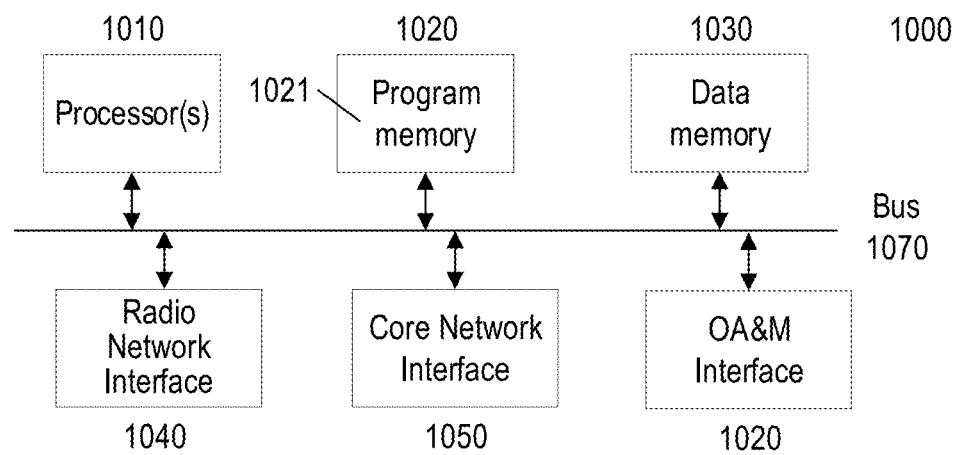
FIG. 10 shows a block diagram of an exemplary network node according to various exemplary embodiments of the present disclosure.

FIG. 10 shows a block diagram of an exemplary network node 1000 according to various embodiments of the present disclosure, including those described above with reference to other figures. For example, exemplary network node 1000 can be configured by execution of instructions, stored on a computer-readable medium, to perform operations corresponding to one or more of the exemplary methods described herein. In some exemplary embodiments, network node 1000 can comprise a base station, eNB, gNB, or one or more components thereof. For example, network node 1000 can be configured as a central unit (CU) and one or more distributed units (DUs) according to NR gNB architectures specified by 3GPP. More generally, the functionally of network node 1000 can be distributed across various physical devices and/or functional units, modules, etc.

Network node 1000 can include processor 1010 (also referred to as "processing circuitry") that is operably connected to program memory 1020 and data memory 1030 via bus 1070, which can include parallel address and data buses, serial ports, or other methods and/or structures known to those of ordinary skill in the art.

Program memory 1020 can store software code, programs, and/or instructions (collectively shown as computer program product 1021 in FIG. 10) that, when executed by processor 1010, can configure and/or facilitate network node 1000 to perform various operations, including operations corresponding to various exemplary methods described herein. As part of and/or in addition to such operations, program memory 1020 can also include software code executed by processor 1010 that can configure and/or facilitate network node 1000 to communicate with one or more other UEs or network nodes using other protocols or protocol layers, such as one or more of the PHY, MAC, RLC, PDCP, and RRC layer protocols standardized by 3GPP for LTE, LTE-A, and/or NR, or any other higher-layer (e.g., NAS) protocols utilized in conjunction with radio network interface 1040 and/or core network interface 1050. By way of example, core network interface 1050 can comprise the S1 or NG interface and radio network interface 1040 can comprise the Uu interface, as standardized by 3GPP. Program memory 1020 can also comprise software code executed by processor 1010 to control the functions of network node 1000, including configuring and controlling various components such as radio network interface 1040 and core network interface 1050.

Data memory 1030 can comprise memory area for processor 1010 to store variables used in protocols, configuration, control, and other functions of network node 1000. As such, program memory 1020 and data memory 1030 can comprise non-volatile memory (e.g., flash memory, hard disk, etc.), volatile memory (e.g., static or dynamic RAM), network-based (e.g., "cloud") storage, or a combination thereof. Persons of ordinary skill in the art will recognize that processor 1010 can include multiple individual processors (not shown), each of which implements a portion of the functionality described above. In such case, multiple individual processors may be commonly connected to program memory 1020 and data memory 1030 or individually connected to multiple individual program memories and/or data memories. More generally, persons of ordinary skill will recognize that various protocols and other functions of network node 1000 may be implemented in many different combinations of hardware and software including, but not limited to, application processors, signal processors, general-purpose processors, multi-core processors, ASICs, fixed digital circuitry, programmable digital circuitry, analog baseband circuitry, radio-frequency circuitry, software, firmware, and middleware.

Radio network interface 1040 can comprise transmitters, receivers, signal processors, ASICs, antennas, beamforming units, and other circuitry that enables network node 1000 to communicate with other equipment such as, in some embodiments, a plurality of compatible user equipment (UE). In some embodiments, interface 1040 can also enable network node 1000 to communicate with compatible satellites of a satellite communication network. In some exemplary embodiments, radio network interface 1040 can comprise various protocols or protocol layers, such as the PHY, MAC, RLC, PDCP, and/or RRC layer protocols standardized by 3GPP for LTE, LTE-A, LTE-LAA, NR, NR-U, etc.; improvements thereto such as described herein above; or any other higher-layer protocols utilized in conjunction with radio network interface 1040. According to further exemplary embodiments of the present disclosure, the radio network interface 1040 can comprise a PHY layer based on OFDM, OFDMA, and/or SC-FDMA technologies. In some embodiments, the functionality of such a PHY layer can be provided cooperatively by radio network interface 1040 and processor 1010 (including program code in memory 1020).

Core network interface 1050 can comprise transmitters, receivers, and other circuitry that enables network node 1000 to communicate with other equipment in a core network such as, in some embodiments, circuit-switched (CS) and/or packet-switched Core (PS) networks. In some embodiments, core network interface 1050 can comprise the S1 interface standardized by 3GPP. In some embodiments, core network interface 1050 can comprise the NG interface standardized by 3GPP. In some exemplary embodiments, core network interface 1050 can comprise one or more interfaces to one or more AMFs, SMFs, SGWs, MMEs, SGSNs, GGSNs, and other physical devices that comprise functionality found in GERAN, UTRAN, EPC, 5GC, and CDMA2000 core networks that are known to persons of ordinary skill in the art. In some embodiments, these one or more interfaces may be multiplexed together on a single physical interface. In some embodiments, lower layers of core network interface 1050 can comprise one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art.

In some embodiments, network node 1000 can include hardware and/or software that configures and/or facilitates network node 1000 to communicate with other network nodes in a RAN, such as with other eNBs, gNBs, ng-eNBs, en-gNBs, IAB nodes, etc. Such hardware and/or software can be part of radio network interface 1040 and/or core network interface 1050, or it can be a separate functional unit (not shown). For example, such hardware and/or software can configure and/or facilitate network node 1000 to communicate with other RAN nodes via the X2 or Xn interfaces, as standardized by 3GPP.

OA&M interface 1060 can comprise transmitters, receivers, and other circuitry that enables network node 1000 to communicate with external networks, computers, databases, and the like for purposes of operations, administration, and maintenance of network node 1000 or other network equipment operably connected thereto. Lower layers of OA&M interface 1060 can comprise one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art. Moreover, in some embodiments, one or more of radio network interface 1040, core network interface 1050, and OA&M interface 1060 may be multiplexed together on a single physical interface, such as the examples listed above.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the spirit and scope of the disclosure. Various exemplary embodiments can be used together with one another, as well as interchangeably therewith, as should be understood by those having ordinary skill in the art.

The term unit, as used herein, can have conventional meaning in the field of electronics, electrical devices and/or electronic devices and can include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

As described herein, device and/or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus can be implemented by any combination of hardware and software. A device or apparatus can also be regarded as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. Such and similar principles are considered as known to a skilled person.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In addition, certain terms used in the present disclosure, including the specification and drawings, can be used synonymously in certain instances (e.g., "data" and "information"). It should be understood, that although these terms (and/or other terms that can be synonymous to one another) can be used synonymously herein, there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

Embodiments of the techniques and apparatus described herein also include, but are not limited to, the following enumerated examples:

E1. A method for determining a preferred route from a starting point to a destination for a vehicle powered by a battery, the method comprising:
  determining a plurality of candidate routes from the starting point to the destination, wherein:
    each candidate route includes a plurality of segments, and
    each segment is associated with a slope and a distance;
  determining a current state of charge (SOC) and a discharge profile for the battery;
  estimating battery discharge amounts and durations for the respective segments based on the discharge profile and the respective slopes and distances; and
  selecting one or more preferred routes, from the candidate routes, based on the SOC and the estimated battery discharge amounts and durations for the respective segments.

E2. The method of embodiment E1, wherein the discharge profile comprises a plurality of discharge current levels and associated battery depletion rates.

E3. The method of embodiment E2, wherein estimating the battery discharge amounts comprises, for each segment:
  determining a plurality of candidate speed-duration pairs, wherein:
    each candidate speed is associated with one of the plurality of discharge current levels, and
    each candidate duration indicates a duration of travel for the segment at the candidate speed; and
  for each candidate speed-duration pair, determining a battery discharge amount based on the candidate duration and the battery depletion rate associated with the discharge current level.

E4. The method of embodiment E3, wherein estimating the battery discharge amounts further comprises selecting one of the candidate speed-duration pairs for each segment based on one of the following criteria:
  minimum battery discharge amount;
  minimum duration;
  minimum battery discharge amount subject to a duration less than a first threshold; or
  minimum duration subject to a battery discharge amount less than a second threshold.

E5. The method of any of embodiments E3-E4, wherein selecting the one or more preferred routes comprises:

for each candidate route, determining a total battery discharge amount based on a sum of the estimated battery discharge amounts for the respective segments of the candidate route;

for each candidate route, determining a total duration based on a sum of the durations for the respective segments of the candidate route; and selecting the one or more preferred routes based on the respective total battery depletions and the respective total durations.

E6. The method of embodiment E5, wherein selecting the one or more preferred routes is based on minimum total duration subject to one of the following:

total battery discharge amount being less than the current SOC, or availability of one or more of the following on a candidate route:

charging stations for recharging the battery; and exchange stations for exchanging the vehicle or the battery.

E7. The method of any of embodiments E1-E6, wherein:

the one or more preferred routes comprise a plurality of preferred routes; and the method further comprises:

displaying information about the plurality of preferred routes to a user, wherein the displayed information for each preferred route includes a total duration of travel and an indication of whether the route can be completed with the current SOC; and receiving, from the user, a selection of one of the preferred routes.

E8. The method of embodiment E7, wherein the displayed information for each preferred route also includes one or more of the following:

locations for one or more charging stations on the preferred route;

occupancy or availability of the charging stations;

charging capability of the charging stations; and any user incentives associated with the preferred route.

E9. The method of embodiment E7, wherein the displayed information for each preferred route also includes one or more of the following:

locations for one or more exchange stations on the preferred route;

inventory of vehicles or batteries available for exchange at the exchange stations;

SOC of the vehicles or batteries available for exchange at the exchange stations;

one or more recommended vehicles or batteries available for exchange at the exchange stations; and any user incentives associated with the preferred route.

E10. The method of any of embodiments E1-E9, further comprising retrieving map information from a remote database via a connection with a wide-area wireless network, wherein the plurality of routes are determined based on the retrieved map information.

E10a. The method of embodiment E10, wherein the slopes associated with the respective segments of the candidate routes are determined based on slope and/or elevation information included in the map information.

E11. The method of any of embodiments E1-E10a, wherein determining the current SOC and the discharge profile for the battery comprises retrieving the SOC and the discharge profile from the vehicle or the battery via one of the following:

a connection with a wide-area wireless network;

a short-range wireless connection to the vehicle or the battery; or a wired connection to the vehicle or the battery.

E12. The method of any of embodiments E1-E11, wherein the vehicle is one of the following: a car, a truck, a scooter, or a motorcycle.

E13. The method of any of embodiments E1-E12, wherein the method is performed by one of the following: a wireless device separate from the vehicle, or a wireless device integrated with the vehicle.

E14. A wireless device configured to determine a preferred route from a starting point to a destination for a vehicle powered by a battery, the wireless device comprising:

communication circuitry configured to communicate with the vehicle and/or the battery; and processing circuitry operably coupled to the radio transceiver circuitry, whereby the processing circuitry is operable to:

determine a plurality of candidate routes from the starting point to the destination, wherein:

each candidate route includes a plurality of segments, and each segment is associated with a slope and a distance;

determine a current state of charge (SOC) and a discharge profile for the battery;

estimate battery discharge amounts and durations for the respective segments based on the discharge profile and the respective slopes and distances; and select one or more preferred routes, from the candidate routes, based on the SOC and the estimated battery discharge amounts and durations for the respective segments.

E15. The wireless device of embodiment E14, wherein the discharge profile comprises a plurality of discharge current levels and associated battery depletion rates.

E16. The wireless device of embodiment E15, wherein the processing circuitry is operable to estimate the battery discharge amounts, for each segment, based on:

determining a plurality of candidate speed-duration pairs, wherein:

each candidate speed is associated with one of the plurality of discharge current levels, and each candidate duration indicates a duration of travel for the segment at the candidate speed; and for each candidate speed-duration pair, determining a battery discharge amount based on the candidate duration and the battery depletion rate associated with the discharge current level.

E17. The wireless device of embodiment E16, wherein the processing circuitry is further operable to estimate the battery discharge amounts by selecting one of the candidate speed-duration pairs for each segment based on one of the following criteria:

minimum battery discharge amount;

minimum duration;

minimum battery discharge amount subject to a duration less than a first threshold; or minimum duration subject to a battery discharge amount less than a second threshold.

E18. The wireless device of any of embodiments E16-E17, wherein the processing circuitry is operable to select the one or more preferred routes based on:

for each candidate route, determining a total battery discharge amount based on a sum of the estimated battery discharge amounts for the respective segments of the candidate route;

for each candidate route, determining a total duration based on a sum of the durations for the respective segments of the candidate route; and
selecting the one or more preferred routes based on the respective total battery depletions and the respective total durations.

E19. The wireless device of embodiment E18, wherein the processing circuitry is further operable to select the one or more preferred routes based on minimum total duration subject to one of the following:
total battery discharge amount being less than the current SOC, or
availability of one or more of the following on a candidate route:
charging stations for recharging the battery; and
exchange stations for exchanging the vehicle or the battery.

E20. The wireless device of any of embodiments E14-E19, wherein:
the one or more preferred routes comprise a plurality of preferred routes; and
the processing circuitry is further operable to:
display information about the plurality of preferred routes to a user, wherein the displayed information for each preferred route includes a total duration of travel and an indication of whether the route can be completed with the current SOC; and
receive, from the user, a selection of one of the preferred routes.

E21. The wireless device of embodiment E20, wherein the displayed information for each preferred route also includes one or more of the following:
locations for one or more charging stations on the preferred route;
occupancy or availability of the charging stations;
charging capability of the charging stations; and
any user incentives associated with the preferred route.

E22. The wireless device of embodiment E20, wherein the displayed information for each preferred route also includes one or more of the following:
locations for one or more exchange stations on the preferred route;
inventory of vehicles or batteries available for exchange at the exchange stations;
SOC of the vehicles or batteries available for exchange at the exchange stations;
one or more recommended vehicles or batteries available for exchange at the exchange stations; and
any user incentives associated with the preferred route.

E23. The wireless device of any of embodiments E14-22, wherein:
the communication circuitry includes a wide-area wireless transceiver;
the processing circuitry is further operable to retrieving map information from a remote database via a connection with a wide-area wireless network; and
the plurality of routes are determined based on the retrieved map information.

E23a. The wireless device of embodiment E23, wherein the processing circuitry is further operable to determine the slopes associated with the respective segments of the candidate routes based on slope and/or elevation information included in the map information.

E24. The wireless device of any of embodiments E14-E23a, wherein the processing circuitry is operable to determine the current SOC and the discharge profile for the battery by retrieving the SOC and the discharge profile from the vehicle or the battery via one of the following:
a connection with a wide-area wireless network, wherein the communication circuitry includes a wide-area wireless transceiver;
a short-range wireless connection to the vehicle or the battery, wherein the communication circuitry includes a short-range wireless transceiver; or
a wired connection to the vehicle or the battery, wherein the communication circuitry includes a digital communications bus.

E25. The wireless device of any of embodiments E14-E24, wherein the vehicle is one of the following: a car, a truck, a scooter, or a motorcycle.

E26. The wireless device of any of embodiments E14-E25, wherein the wireless device is one of the following: separate from the vehicle, or integrated with the vehicle.

E27. A wireless device configured to determine a preferred route from a starting point to a destination for a vehicle powered by a battery, the wireless device being further configured to perform operations corresponding to any of embodiments E1-E13.

E28. A non-transitory, computer-readable medium storing computer-executable instructions that, when executed by processing circuitry, configure a wireless device to perform operations corresponding to any of embodiments E1-E13.

E29. A computer program product comprising computer-executable instructions that, when executed by processing circuitry, configure a wireless device to perform operations corresponding to any of embodiments E1-E13.

The invention claimed is:

1. A method, for a wireless device, to determine one or more preferred routes for an electric vehicle powered by a battery, the method comprising:
determining a plurality of candidate routes from a starting point to a destination, wherein:
each candidate route includes one or more segments, and
each segment is associated with a slope and a distance;
for each candidate route, estimating a route battery discharge amount and a route duration of travel based on a discharge profile for the battery and the slopes and distances associated with the segments included in the candidate route, wherein the estimating is performed without use of battery state of charge (SOC) measurements associated with the segments included in the candidate route; and
selecting one or more preferred routes, from the candidate routes, based on a current SOC for the battery, the estimated route battery discharge amounts, and the estimated route durations of travel.

2. The method of claim 1, wherein:
the discharge profile comprises a plurality of discharge current levels; and
estimating the route battery discharge amounts and the route durations of travel comprises determining, for each segment, a plurality of candidate tuples corresponding to the respective plurality of discharge current levels, wherein each candidate tuple includes:
a segment speed, estimated based on the corresponding discharge current level and the segment slope,
a segment duration of travel, estimated based on the segment speed and the segment distance, and
a segment battery discharge amount, estimated based on the segment duration of travel and the corresponding discharge current level.

3. The method of claim 2, wherein estimating the route battery discharge amounts and route durations of travel further comprises selecting one of the candidate tuples for each segment based on one of the following criteria:
- minimum segment battery discharge amount;
- minimum segment duration of travel;
- minimum segment battery discharge amount subject to a segment duration of travel less than a first threshold; or
- minimum segment duration of travel subject to a segment battery discharge amount less than a second threshold.

4. The method of claim 1, wherein estimating the route battery discharge amounts and the route durations of travel comprises:
- for each candidate route, determining the route battery discharge amount based on a sum of segment battery discharge amounts for the respective segments of the candidate route; and
- for each candidate route, determining the route duration of travel based on a sum of segment durations of travel for the respective segments of the candidate route.

5. The method of claim 1, wherein the selected one or more preferred routes are candidate routes having minimum route durations of travel and at least one of the following:
- route battery discharge amounts less than the current SOC,
- charging stations for recharging the battery, and
- exchange stations for exchanging the vehicle or the battery.

6. The method of claim 1, wherein:
the one or more preferred routes comprise a plurality of preferred routes; and
the method further comprises:
- displaying information about the plurality of preferred routes to a user, wherein the displayed information for each preferred route includes a route duration of travel and an indication of whether the route can be completed with the current SOC; and
- receiving, from the user, a selection of one of the preferred routes.

7. The method of claim 6, wherein the displayed information for each preferred route also includes one or more of the following:
- locations of one or more charging stations in relation to the preferred route;
- occupancy or availability of the charging stations;
- charging capability of the charging stations; and
- any user incentives associated with the preferred route.

8. The method of claim 6, wherein the displayed information for each preferred route also includes one or more of the following:
- locations for one or more exchange stations in relation to the preferred route;
- inventory of vehicles or batteries available for exchange at the exchange stations;
- SOC of the vehicles or batteries available for exchange at the exchange stations;
- one or more recommended vehicles or batteries available for exchange at the exchange stations; and
- any user incentives associated with the preferred route.

9. The method of claim 1, wherein:
the method further comprises retrieving map information from a remote database via a connection with a wide-area wireless network; and
determining the plurality of candidate routes comprises determining the slopes associated with the respective segments of the candidate routes based on slope information and/or elevation information included in the map information.

10. The method of claim 1, further comprising retrieving the SOC and the discharge profile from the vehicle or the battery via one of the following:
- a connection with a wide-area wireless network;
- a short-range wireless connection to the vehicle or the battery; or
- a wired connection to the vehicle or the battery.

11. A wireless device configured to determine one or more preferred routes for an electric vehicle powered by a battery, the wireless device comprising:
- communication circuitry configured to communicate with at least one of the vehicle and the battery; and
- processing circuitry operably coupled to the communication circuitry, whereby the processing circuitry is operable to:
  - determine a plurality of candidate routes from a starting point to a destination, wherein:
    - each candidate route includes one or more segments, and
    - each segment is associated with a slope and a distance;
  - for each candidate route, estimate a route battery discharge amount and a route duration of travel based on a discharge profile for the battery and the slopes and distances associated with the segments included in the candidate route, wherein the estimate is performed without use of battery state of charge (SOC) measurements associated with the segments included in the candidate route; and
  - select one or more preferred routes, from the candidate routes, based on a current SOC for the battery, the estimated route battery discharge amounts, and the estimated route durations of travel.

12. The wireless device of claim 11, wherein:
the discharge profile comprises a plurality of discharge current levels; and
the processing circuitry is operable to estimate the route battery discharge amounts and the route durations of travel based on determining, for each segment, a plurality of candidate tuples corresponding to the respective plurality of discharge current levels, wherein each candidate tuple includes:
- a segment speed, estimated based on the corresponding discharge current level and the segment slope,
- a segment duration of travel, estimated based on the segment speed and the segment distance, and
- a segment battery discharge amount, estimated based on the segment duration of travel and the corresponding discharge current level.

13. The wireless device of claim 12, wherein the processing circuitry is further operable to estimate the route battery discharge amounts and route durations of travel based on selecting one of the candidate tuples for each segment based on one of the following criteria:
- minimum segment battery discharge amount;
- minimum segment duration of travel;
- minimum segment battery discharge amount subject to a segment duration of travel less than a first threshold; or
- minimum segment duration of travel subject to a segment battery discharge amount less than a second threshold.

14. The wireless device of claim 11, wherein the processing circuitry is operable to estimate the route battery discharge amounts and the route durations of travel based on:

for each candidate route, determining the route battery discharge amount based on a sum of segment battery discharge amounts for the respective segments of the candidate route; and for each candidate route, determining the route duration of travel based on a sum of segment durations of travel for the respective segments of the candidate route.

15. The wireless device of claim 11, wherein the selected one or more preferred routes are candidate routes having minimum route durations of travel and at least one of the following:

route battery discharge amounts less than the current SOC, charging stations for recharging the battery, and exchange stations for exchanging the vehicle or the battery.

16. The wireless device of claim 11, wherein:

the one or more preferred routes comprise a plurality of preferred routes; and the processing circuitry is further operable to:

display information about the plurality of preferred routes to a user, wherein the displayed information for each preferred route includes a total duration of travel and an indication of whether the route can be completed with the current SOC; and receive, from the user, a selection of one of the preferred routes.

17. The wireless device of claim 16, wherein the displayed information for each preferred route also includes one or more of the following:

locations of one or more charging stations in relation to the preferred route;

occupancy or availability of the charging stations;

charging capability of the charging stations; and any user incentives associated with the preferred route.

18. The wireless device of claim 16, wherein the displayed information for each preferred route also includes one or more of the following:

locations for one or more exchange stations in relation to the preferred route;

inventory of vehicles or batteries available for exchange at the exchange stations;

SOC of the vehicles or batteries available for exchange at the exchange stations;

one or more recommended vehicles or batteries available for exchange at the exchange stations; and any user incentives associated with the preferred route.

19. The wireless device of claim 11, wherein:

the communication circuitry includes a wide-area wireless transceiver;

the processing circuitry is further operable to:

retrieve map information from a remote database via a connection with a wide-area wireless network; and determine the slopes associated with the respective segments of the candidate routes based on slope information and/or elevation information included in the map information.

20. The wireless device of claim 11, wherein the processing circuitry is further operable to retrieve the SOC and the discharge profile from the vehicle or the battery via one of the following:

a connection with a wide-area wireless network, wherein the communication circuitry includes a wide-area wireless transceiver;

a short-range wireless connection to the vehicle or the battery, wherein the communication circuitry includes a short-range wireless transceiver; or a wired connection to the vehicle or the battery, wherein the communication circuitry includes a digital communications bus.

21. An electric vehicle comprising:

a battery arranged to provide power for vehicle propulsion;

the wireless device of claim 11, operably coupled to the vehicle; and communication circuitry configured to communicate with at least one of the battery and the wireless device.

22. A non-transitory, computer-readable medium storing computer-executable instructions that, when executed by processing circuitry, configure a wireless device to:

determine a plurality of candidate routes from a starting point to a destination for an electric vehicle powered by a battery, wherein:

each candidate route includes one or more segments, and each segment is associated with a slope and a distance;

for each candidate route, estimate a route battery discharge amount and a route duration of travel based on a discharge profile for the battery and the slopes and distances associated with the segments included in the candidate route, wherein the estimate is performed without use of battery state of charge (SOC) measurements associated with the segments included in the candidate route; and select one or more preferred routes, from the candidate routes, based on a current SOC for the battery, the estimated route battery discharge amounts, and the estimated route durations of travel.

* * * * *